US012185657B2

(12) United States Patent
Crews et al.

(10) Patent No.: US 12,185,657 B2
(45) Date of Patent: Jan. 7, 2025

(54) AUTOMATED SEED PLANTER

(71) Applicant: Monsanto Technology LLC, St. Louis, MO (US)

(72) Inventors: Joshua Crews, St. Louis, MO (US); Jeffrey L. Kohne, Kirkwood, MO (US)

(73) Assignee: Monsanto Technology LLC, Saint Louis, MO (US)

( * ) Notice: Subject to any disclaimer, the term of this patent is extended or adjusted under 35 U.S.C. 154(b) by 830 days.

(21) Appl. No.: 17/137,781

(22) Filed: Dec. 30, 2020

(65) Prior Publication Data

US 2021/0195829 A1 Jul. 1, 2021

Related U.S. Application Data

(60) Provisional application No. 62/955,313, filed on Dec. 30, 2019.

(51) Int. Cl.
*A01C 7/04* (2006.01)
*A01C 7/08* (2006.01)
*A01C 7/20* (2006.01)
A01C 21/00 (2006.01)

(52) U.S. Cl.
CPC .............. *A01C 7/042* (2013.01); *A01C 7/081* (2013.01); *A01C 7/20* (2013.01); *A01C 21/005* (2013.01)

(58) Field of Classification Search
CPC ........... A01C 7/042; A01C 7/081; A01C 7/20; A01C 7/044; A01C 21/005
See application file for complete search history.

(56) References Cited

U.S. PATENT DOCUMENTS

| | | | | | |
|---|---|---|---|---|---|
| 3,142,274 | A | * | 7/1964 | Winter | A01C 7/044 111/179 |
| 3,156,201 | A | * | 11/1964 | Tweedale | A01C 7/044 111/179 |
| 3,387,746 | A | * | 6/1968 | Whipple | A01C 7/044 111/179 |
| 3,542,242 | A | * | 11/1970 | Irvine | A01C 7/044 111/179 |

(Continued)

FOREIGN PATENT DOCUMENTS

| | | |
|---|---|---|
| EP | 0216057 A1 | 4/1987 |
| EP | 1621059 A1 | 2/2006 |
| EP | 3187033 A1 | 7/2017 |

*Primary Examiner* — Jamie L McGowan
(74) *Attorney, Agent, or Firm* — Harness, Dickey & Pierce, P.L.C.

(57) ABSTRACT

An automated seed planter may include at least two vacuum cylinders which simultaneously and/or independently pick up and deliver seeds to a single tray. The vacuum cylinders may have a common rotational axis about which the vacuum cylinders rotate. The automated seed planter may include a plurality of vertical seed chutes which receive seeds therein. The vertical seed chutes have open upper and lower ends. A shutter assembly of the seed planter is associated with the lower ends of the vertical seed chutes. The shutter assembly is selectively opens and closes the lower ends of the seed chutes to plant the seeds on the tray. The automated seed planter may include a seed correction assembly including seed wells which receive seeds therein. The seed correction assembly selectively displaces one or more of the seeds from the seed wells to deliver the one or more seeds toward the tray for planting.

11 Claims, 29 Drawing Sheets

(56) References Cited

U.S. PATENT DOCUMENTS

| | | | | |
|---|---|---|---|---|
| 3,757,996 | A * | 9/1973 | Lienemann | A01C 7/044 111/180 |
| 3,790,026 | A * | 2/1974 | Neumeister | A01C 7/044 111/180 |
| 3,848,552 | A * | 11/1974 | Bauman | A01C 7/044 987/202 |
| 3,891,120 | A * | 6/1975 | Loesch | A01C 7/044 111/180 |
| 3,951,306 | A * | 4/1976 | Ernst | A01C 7/04 111/164 |
| 4,145,980 | A * | 3/1979 | Boots | A01C 7/044 111/926 |
| 4,159,064 | A * | 6/1979 | Hood | H03K 21/18 111/180 |
| 4,184,610 | A * | 1/1980 | Thiele | A01C 7/044 111/180 |
| 4,210,260 | A * | 7/1980 | Luttrell | A01C 7/044 111/180 |
| 4,306,509 | A * | 12/1981 | Hassan | A01C 7/044 111/74 |
| 4,411,206 | A * | 10/1983 | Hiscock | A01C 7/044 111/91 |
| 4,703,704 | A * | 11/1987 | Mielke | A01G 9/085 111/179 |
| 4,718,363 | A * | 1/1988 | Williames | A01C 7/044 111/91 |
| 5,231,940 | A * | 8/1993 | Tjeerdsma | A01C 7/044 111/179 |
| 5,431,117 | A * | 7/1995 | Steffens | A01C 7/044 111/180 |
| 5,655,468 | A * | 8/1997 | Ledermann | A01C 7/044 285/8 |
| 6,142,086 | A * | 11/2000 | Richard | A01C 7/044 111/77 |
| 7,174,839 | B2 * | 2/2007 | Tsing | A01C 7/044 111/179 |
| 8,141,504 | B2 * | 3/2012 | Dean | A01C 7/081 111/179 |
| 9,010,258 | B1 * | 4/2015 | Richard | A01C 7/082 111/179 |
| 9,516,804 | B1 * | 12/2016 | Djeu | A01C 7/044 |
| 9,661,805 | B1 * | 5/2017 | Conrad | A01C 7/044 |
| 10,085,375 | B2 * | 10/2018 | Engel | A01C 7/044 |
| 2002/0046696 | A1 | 4/2002 | Lang | |
| 2006/0037520 | A1 * | 2/2006 | Tsing | A01C 7/044 111/179 |
| 2009/0032441 | A1 | 2/2009 | Corak et al. | |
| 2019/0183066 | A1 * | 6/2019 | Conrad | A01C 7/105 |
| 2022/0061207 | A1 * | 3/2022 | Visser | A01C 7/042 |

\* cited by examiner

AUTOMATED SEED PLANTER

CROSS-REFERENCE TO RELATED APPLICATION

The present application claims the benefit of U.S. Provisional Application No. 62/955,313, filed Jan. 30, 2019, the entirety of which is hereby incorporated by reference.

FIELD OF THE DISCLOSURE

The present disclosure generally relates to a seed planter, such as an automated seed planter that can be incorporated into an automated seed planting line or used as a standalone machine.

BACKGROUND OF THE DISCLOSURE

As a non-limiting example, seeds may be tested in a lab-type setting to determine, for example, seed viability and seed vigor. Such seed testing is typically performed manually, making it labor intensive and prone to human error. However, an automated seed planting line, such as one described in U.S. application Ser. No. 16/458,754, would be beneficial to increase throughput and reduce human error.

SUMMARY OF THE DISCLOSURE

In one aspect, an automated seed planter generally comprises at least two vacuum cylinders configured to simultaneously and/or independently pick up and deliver seeds to a single planting tray. For example, the vacuum cylinders may have a common rotational axis about which the vacuum cylinders rotate.

In another aspect, an automated seed planter generally comprises a plurality of vertical seed chutes configured to receive seeds therein. The vertical seed chutes have open upper and lower ends. A shutter assembly of the seed planter is associated with the lower ends of the vertical seed chutes. The shutter assembly is configured to selectively open and close the lower ends of the seed chutes.

In yet another aspect, an automated seed planter generally comprises a seed correction assembly including a plurality of seed wells configured to receive seeds therein. The seed correction assembly is configured to selectively displace one or more of the seeds from the seed wells to deliver the one or more seeds toward a seed tray for planting.

Other features and aspects of the disclosure are described below.

DETAILED DESCRIPTION OF THE DISCLOSURE

Figure 1:
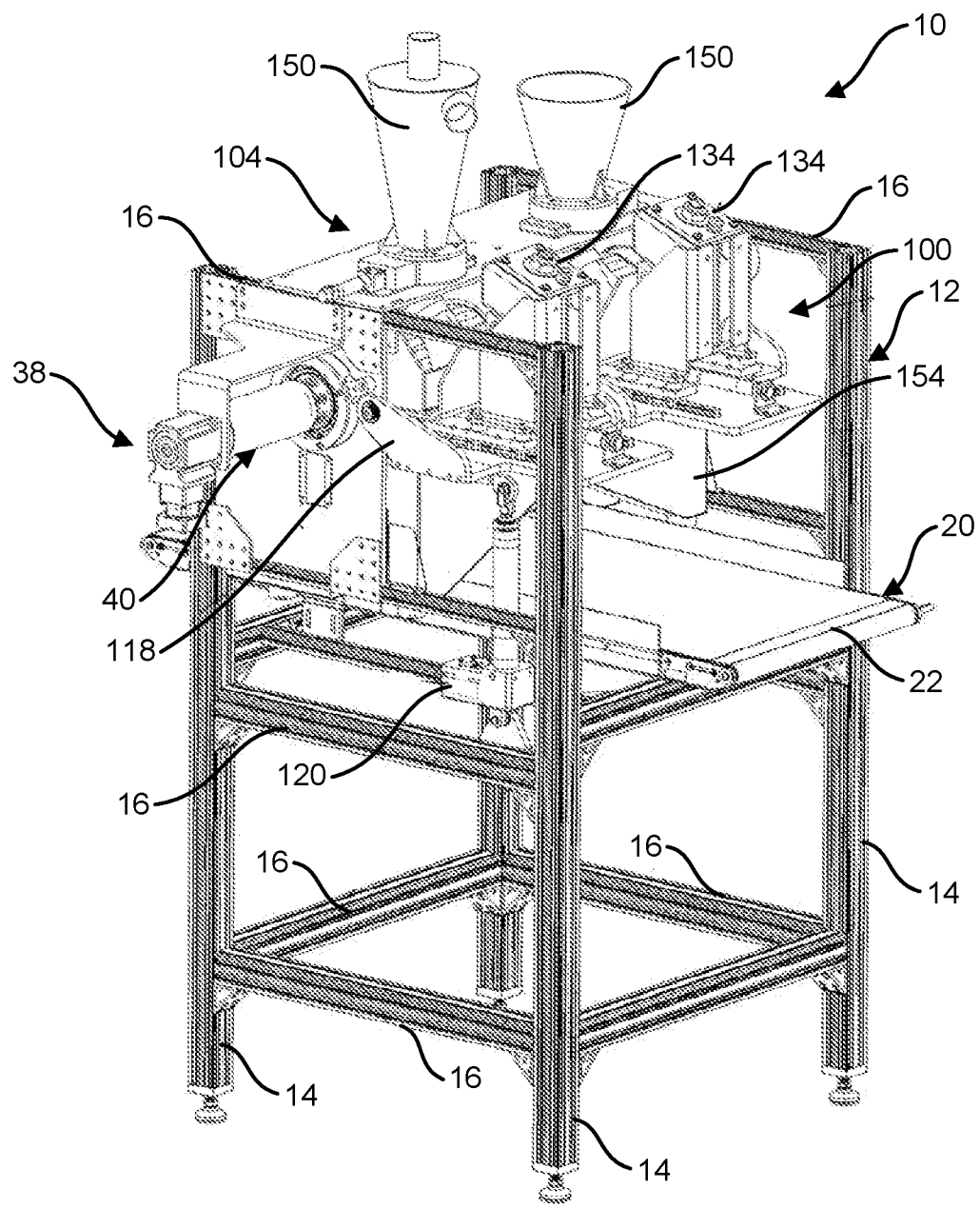
FIG. 1 is a front perspective of an illustrated embodiment of an automated seed planter mounted on a structural support.
Figure 2:
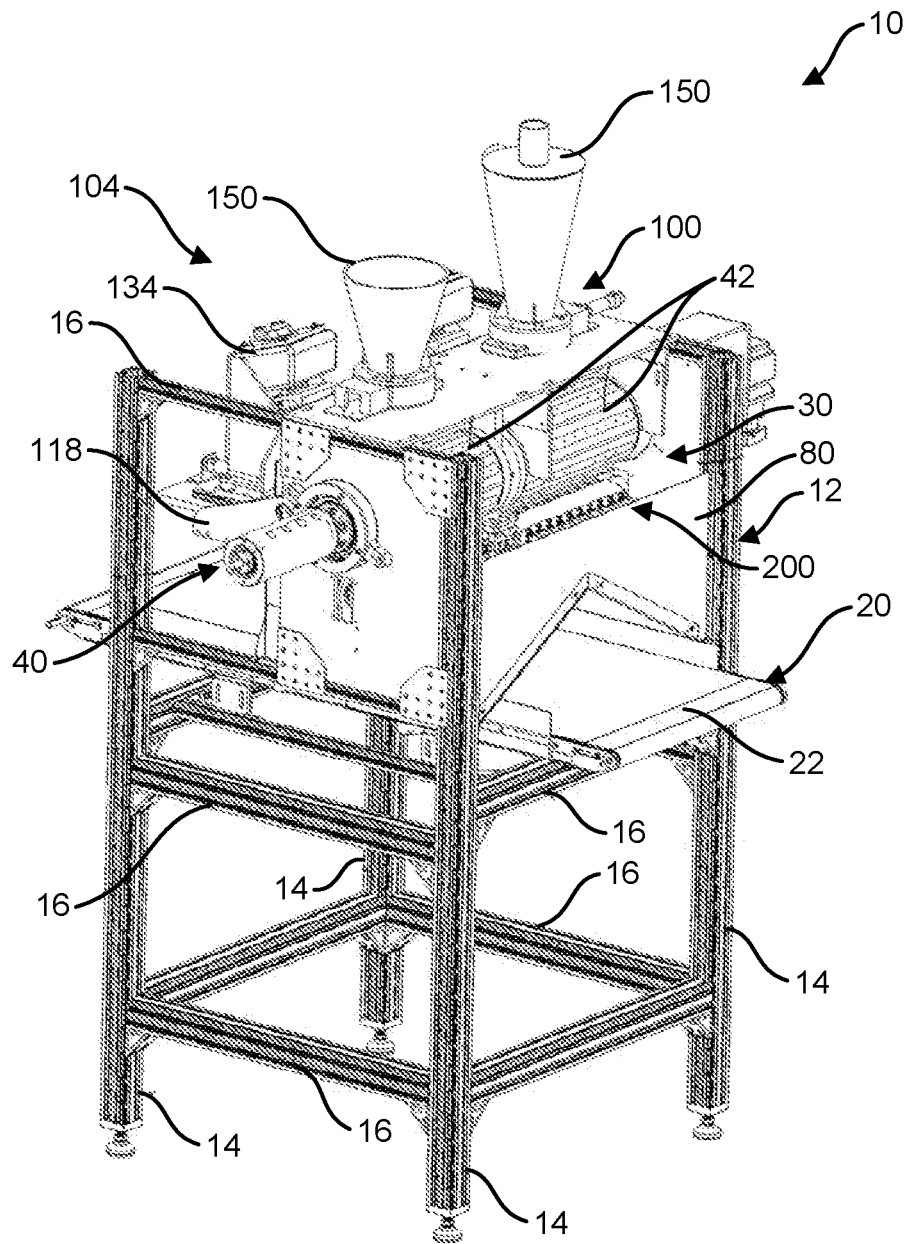
FIG. 2 is a rear perspective of FIG. 1.

Referring to FIGS. 1 and 2, one embodiment of an automated seed planter constructed according to the teachings of the present disclosure is generally indicated at reference numeral 10. The automated seed planter 10 is suitable for use as a seed planting station or system that is part of an automated seed testing system, such as, but not limited to, the automated seed testing system is described in U.S. application Ser. No. 16/458,754, filed Jul. 1, 2019, the entirety of which is incorporated by reference herein. It is understood that the automated seed planter 10 may be used in other types of automated seed planting lines or may be used as a standalone system for planting seeds.

In general, the seed planter 10 includes a seed delivery system 30, a seed supply system 100, and a seed placement system 200. In general, one or more functions and/or operations of each of these systems and components is controlled and/or operated through use of a controller 11, as described in detail in the following description. It is understood the controller 11 may include one or more controllers to perform the functions and operations of the seed planter. For ease of description and without being limiting, the one or more controllers controlling the above-referenced components may be identified by the component being controlled and/or operated.

Figure 3:
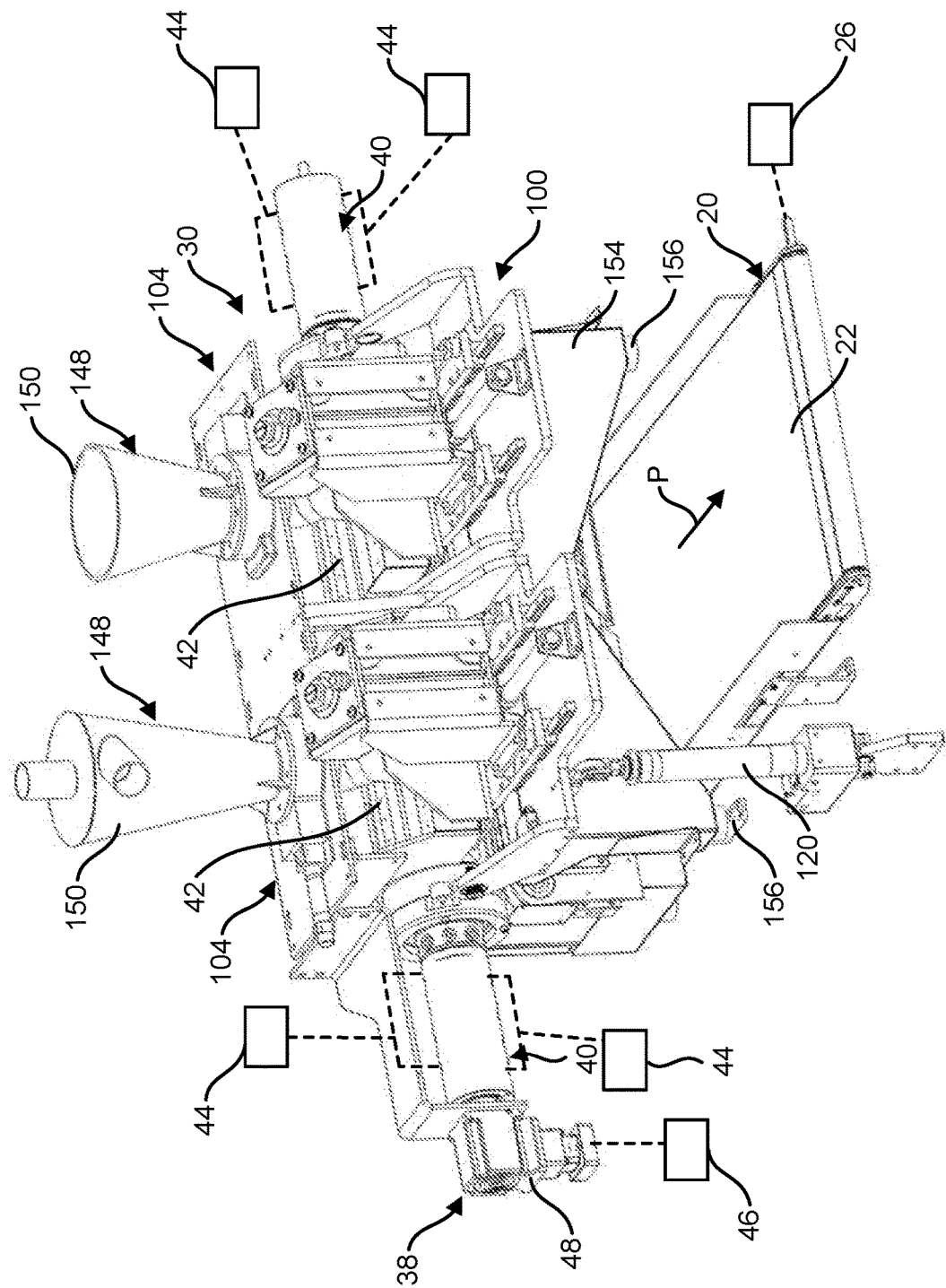
FIG. 3 is an enlarged, front perspective of the automated seed planter removed from the structural support.
Figure 24:
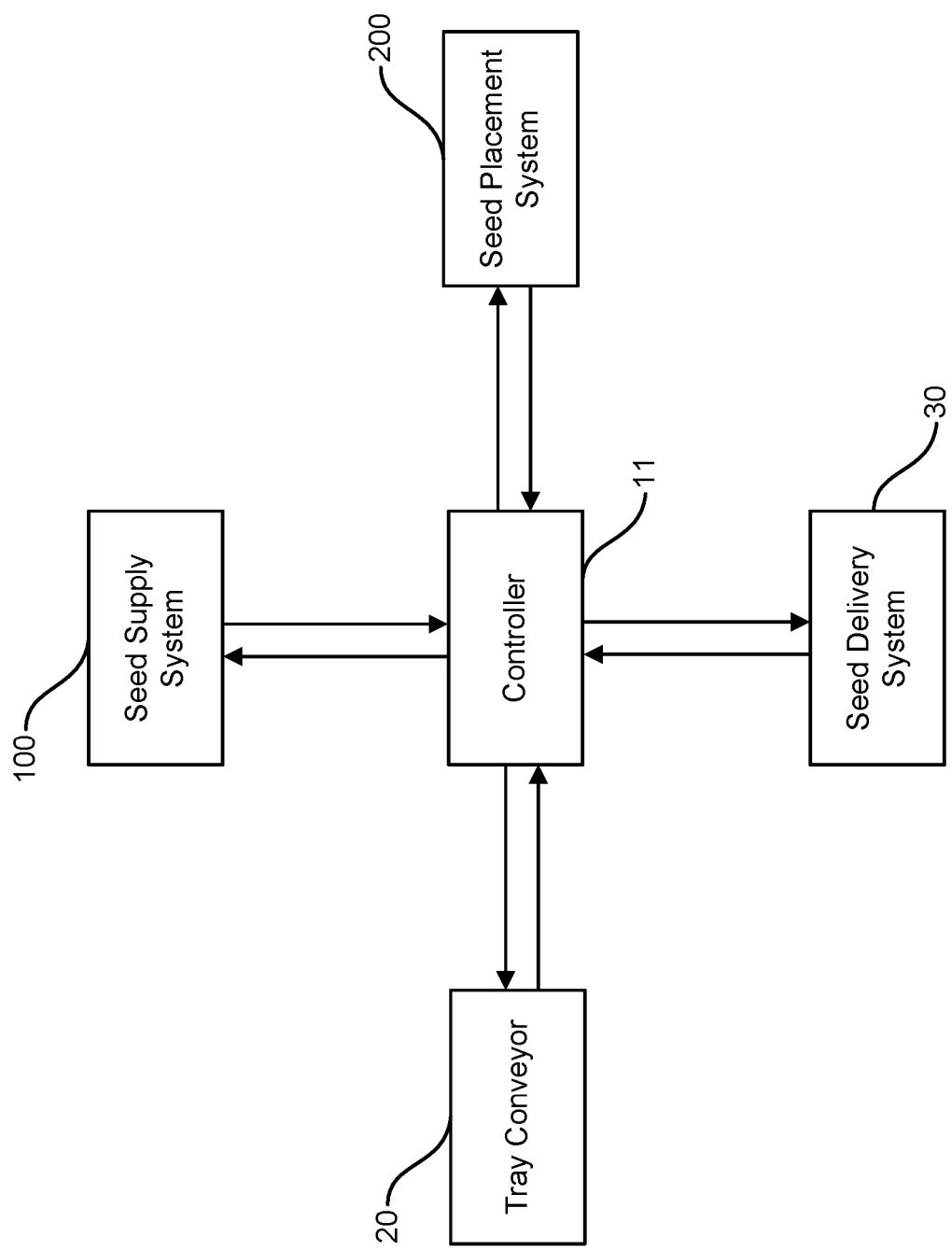
FIG. 24 is a schematic representation of a controller of the seed planter in communication with the systems and tray conveyor of the seed planter.

The illustrated automated seed planter 10 is mounted on a structural support 12, such as a rigid framework. The structural support 12 includes legs 14 and cross supports 16 secured to and extending between the legs to elevate the seed planter 10. A planting tray conveyor, generally indicated at reference numeral 20, is also mounted on the structural support 12. The planting tray conveyor 20 is configured to receive and convey planting trays on a conveyor belt 22. The conveyor belt 22 moves the trays along a path P, shown in FIG. 3, generally below the seed planter 10 so that the seed planter places or plants seeds onto the tray in rows (e.g., 10 rows), as explained in more detail below. In one example, the conveyor belt 22 may have a width of about 18 in and a length of about 48 in. Referring to FIG. 3, a belt driver 26 is operatively coupled to the conveyor belt 22 to drive movement of the belt at a selected speed for placing seeds in rows on the trays. As shown in FIG. 24, the belt driver 26 may be controlled, monitored, and/or adjusted by the controller 11. The seed planter 10 may also include a dust collection system, including a hood mounted on the structural support 12 and a negative pressure source applying negative pressure within the hood to capture debris from the seeds.

Seed Delivery System

Figure 15:
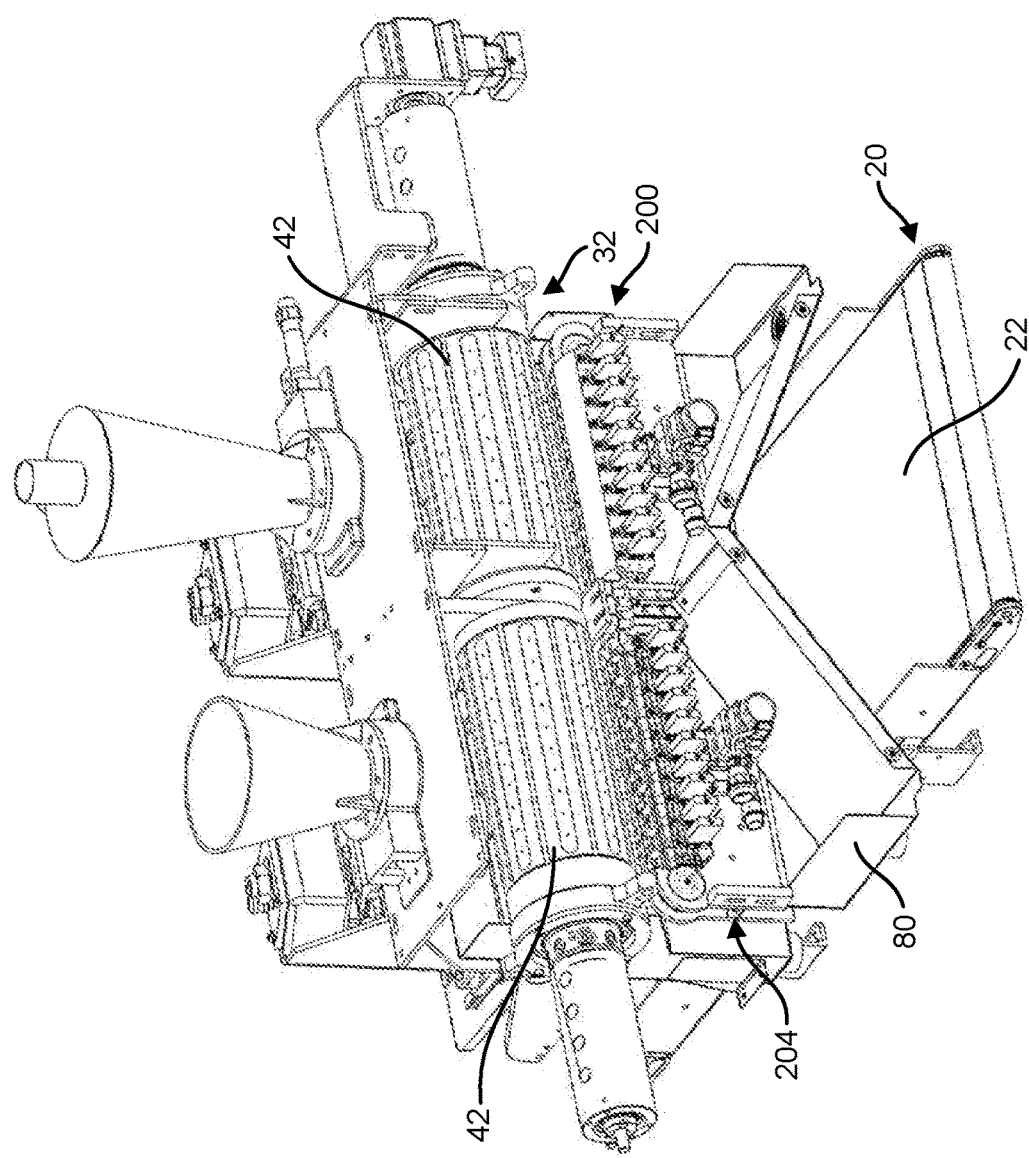
FIG. 15 is an enlarged, rear perspective of the automated seed planter removed from the structural support.
Figure 16:
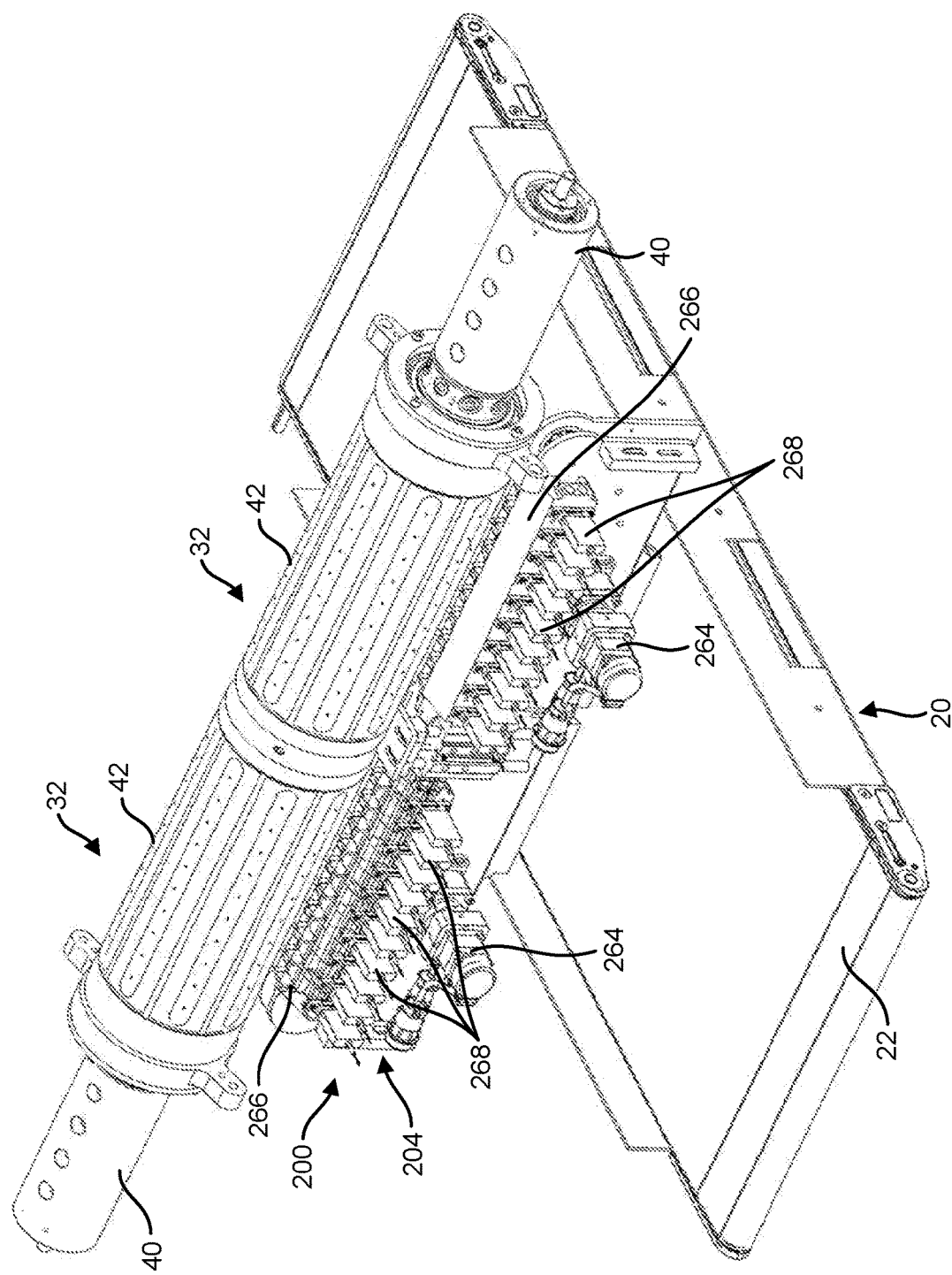
FIG. 16 is an enlarged rear perspective of a seed placement system in association with the vacuum cylinder assemblies.
Figure 17:
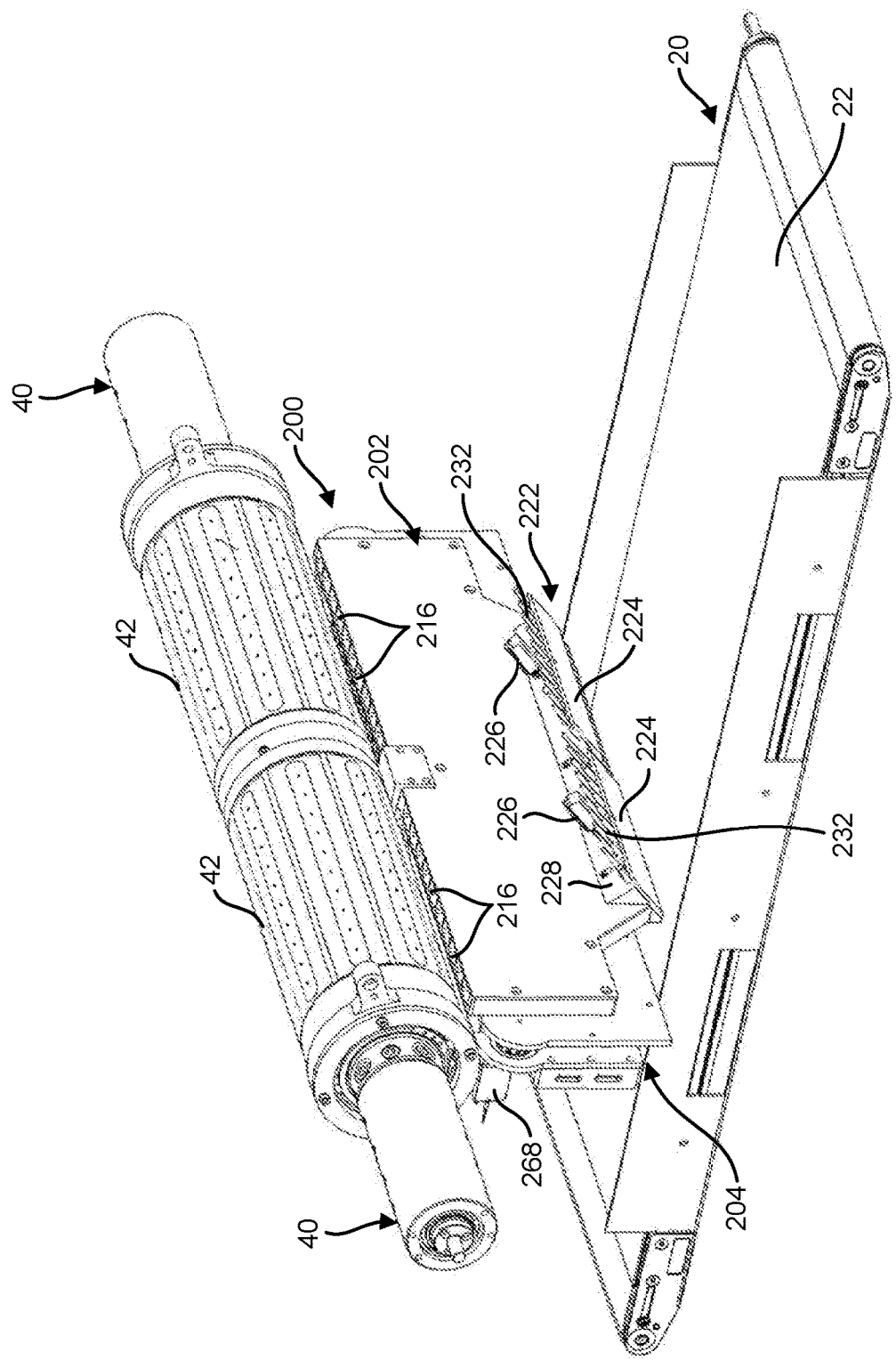
FIG. 17 is an enlarged front perspective of FIG. 16.
Figure 19:
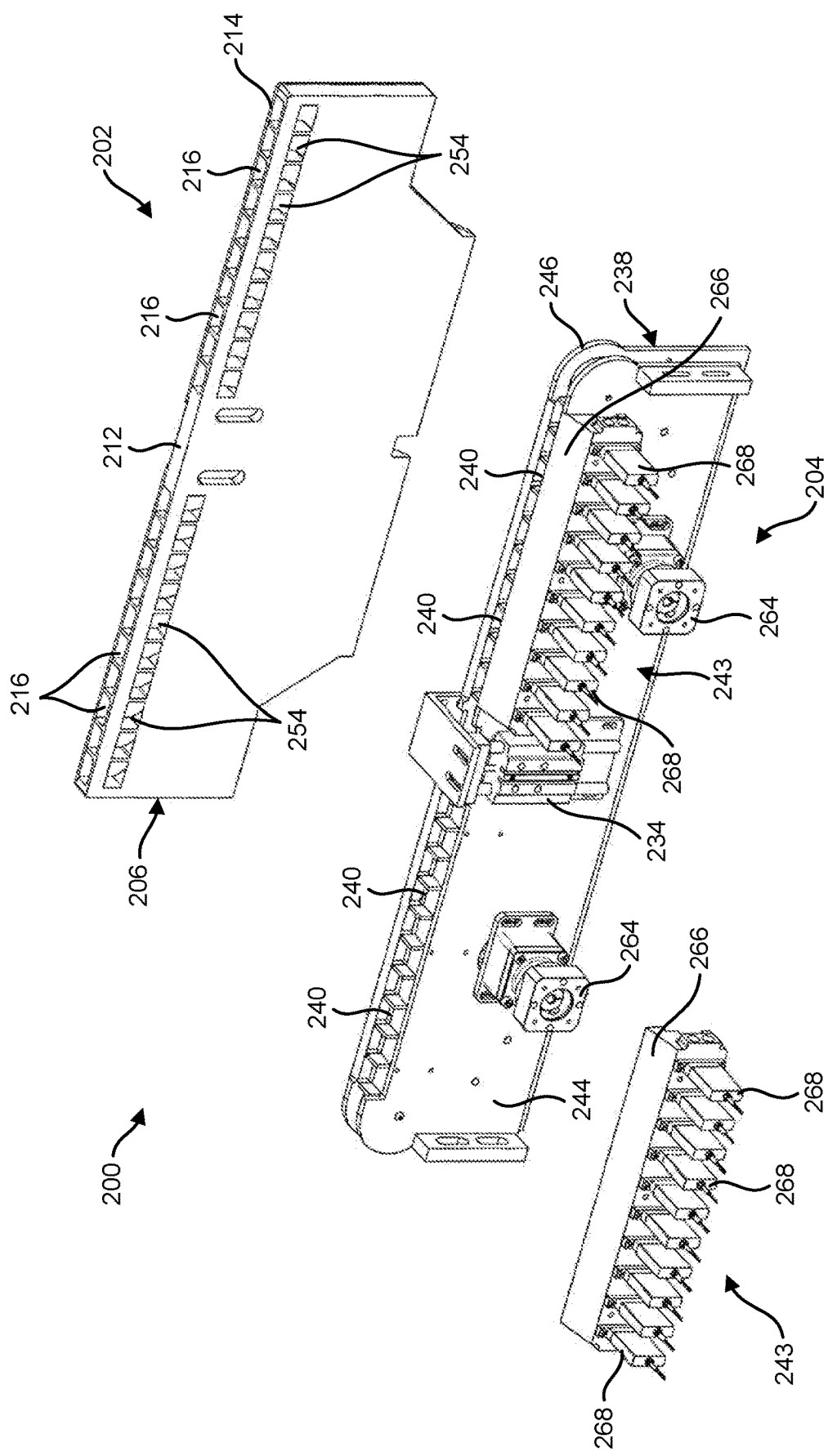
FIG. 19 is an exploded rear perspective of the seed placement system.

The illustrated seed delivery system 30 includes at least one vacuum cylinder assembly 32 configured to pick up seeds from the seed supply system and deliver the seeds to the seed placement system 200, shown in FIGS. 15 and 19. The seed delivery system 30 includes at least two vacuum cylinder assemblies 32, which in the illustrated embodiment are rotatable about a single rotational axis A. The seed delivery system 30 may include three, four, five, or more vacuum cylinder assemblies 32. The vacuum cylinder assemblies 32 are independently controllable or operational by the controller 11 (e.g., a seed delivery controller). In general, the vacuum cylinder assemblies 32 are positioned on either side of a mid-width of the conveyor belt 22. The vacuum cylinder assemblies 32 are essentially identical, mirror images of one another. In other embodiments, the vacuum cylinder assemblies may not be identical, and may have different dimensions, such as different widths or other dimensions, while operating next to each other and simultaneously and/or independently. The vacuum cylinder assembles 32 are supported on the structural support 12 by opposite bearings 34 to allow rotation of the vacuum cylinder assemblies about the rotational axis A and relative to the structural support. As explained in more detail below, each vacuum cylinder assembly 32 may be associated with and dedicated to a single supply of seed. In this way, the planting tray is split in half, left and right, with each half receiving seed from a different seed test lot.

Referring to FIGS. 3-6, each vacuum cylinder assembly 32 includes a rotary drive 38, a rotary union 40, a vacuum cylinder 42, and a pneumatic pressure source 44. The rotatory drive 38 is operatively coupled to the rotary union 40 and is configured to drive rotation of the vacuum cylinder 42 about the rotational axis A through the rotary union, as explained below. The illustrated rotary drive 38 includes a rotary actuator 46, such as a servomotor or other motor, and a gearbox 48 operatively coupling the rotary actuator to the rotary union 40. In one example, the gearbox 48 is a right-angle reducer. Together, in one example, the servomotor 46, the gearbox 48, and the rotary union 40 are configured to drive rotation of the vacuum cylinder 42 from about 10 rpm to about 25 rpm. It is understood that the gearbox 48 may be omitted without necessarily departing from the scope of the present disclosure.

Figure 9:
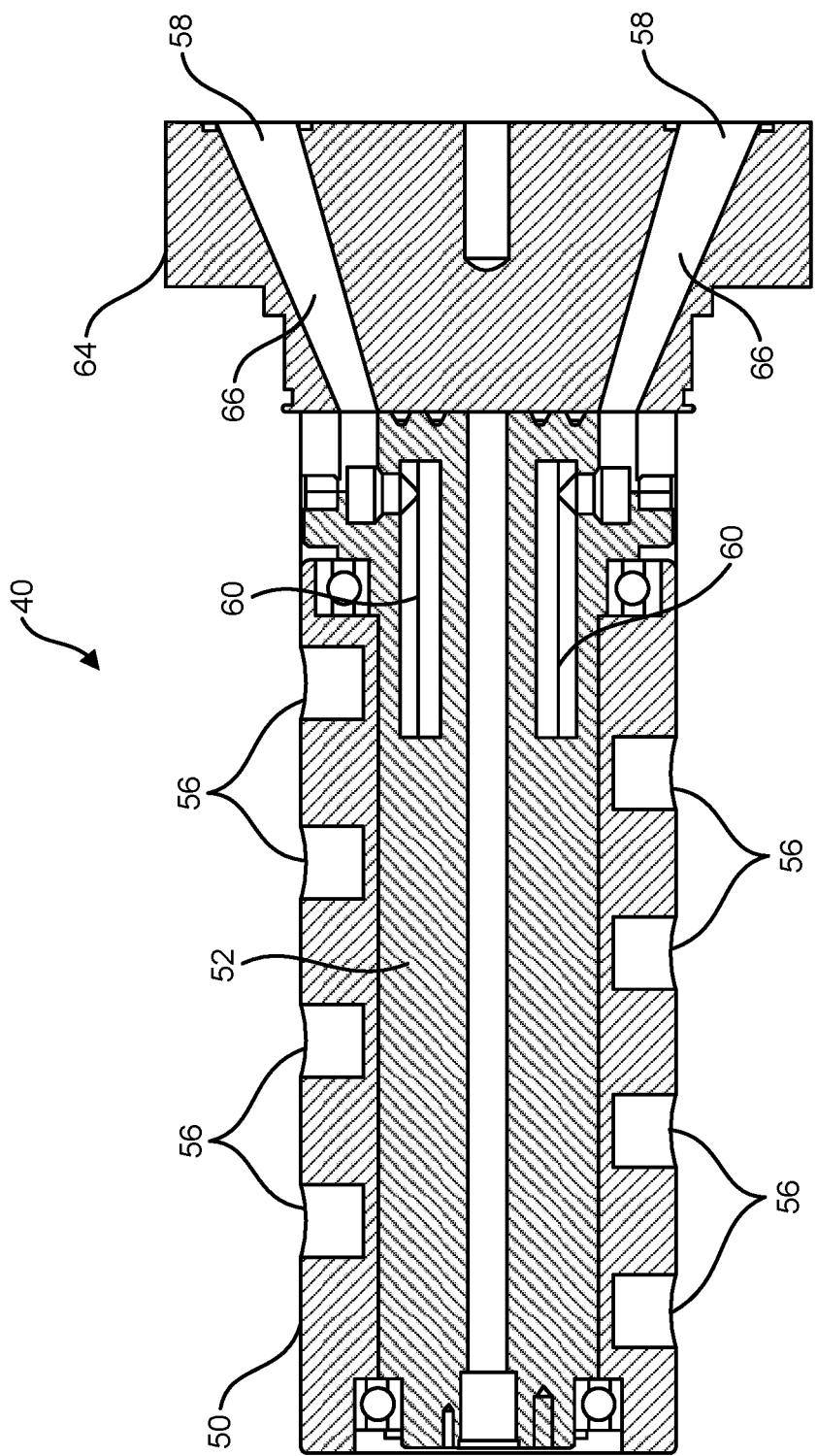
FIG. 9 is a longitudinal section of a rotary union of the vacuum cylinder assembly of FIG. 6.

Referring still to FIGS. 3-6 and 9, the rotary union 40 includes an outer housing 50 and a rotatable shaft 52 rotatable within the housing. The outer housing 50 defines a plurality of inlets 56 (e.g., 8 inlets) in fluid communication with one or more pneumatic pressure sources 44 (FIG. 3), and the shaft 52 defines a plurality of outlets 58 (e.g., 8 outlets) in fluid communication with the vacuum cylinder 42. A plurality of dedicated flow passages 60 within the shaft 52 connect each inlet 56 with one of the outlets 58 to define a plurality of dedicated flow paths. In one example, the pneumatic pressure source 44 includes a negative pressure source, an unregulated positive pressure source, and a regulated positive pressure source, each of which are in selective communication with each of the inlets via a series of valves (e.g., solenoid valves; not shown). These valves are controllable by the controller 11 (e.g., seed delivery controller) to selectively apply negative pressure, positive pressure (or no pressure) within each of the dedicated flow paths. As explained below, each of the dedicated flow paths is in dedicated, fluid communication with a row of seed-holding openings 62 defined by the vacuum cylinder 40. In the illustrated embodiment, as shown in FIG. 9, the rotatable shaft 52 of the rotary union 40 includes a main body and an adaptor plate 64 fixedly secured to the main body. The adaptor plate 64 includes air flow passages 66 of the air paths that flare downstream to increase the surface area of the air paths and define the outlets 58. It is understood that the adaptor plate 64 and the main body may be a single, one-piece construction and/or the rotatable shaft 52 may be of other configurations.

Figure 7:
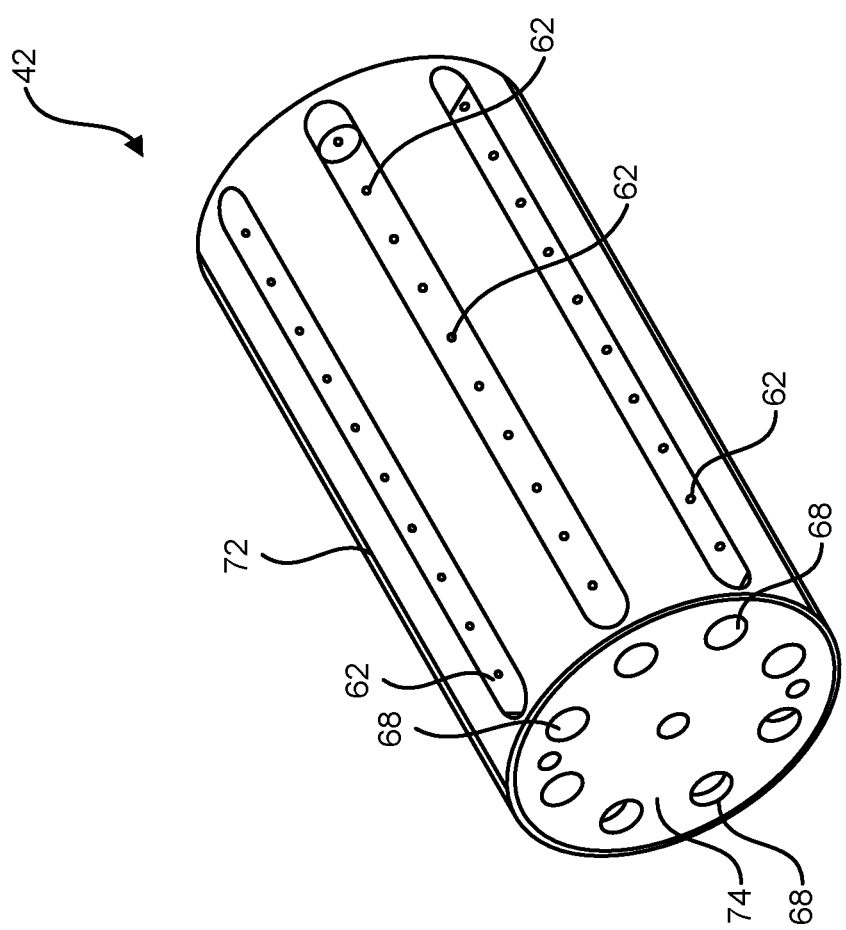
FIG. 7 is a front perspective of a vacuum cylinder of the vacuum cylinder assembly of FIG. 6.
Figure 8:
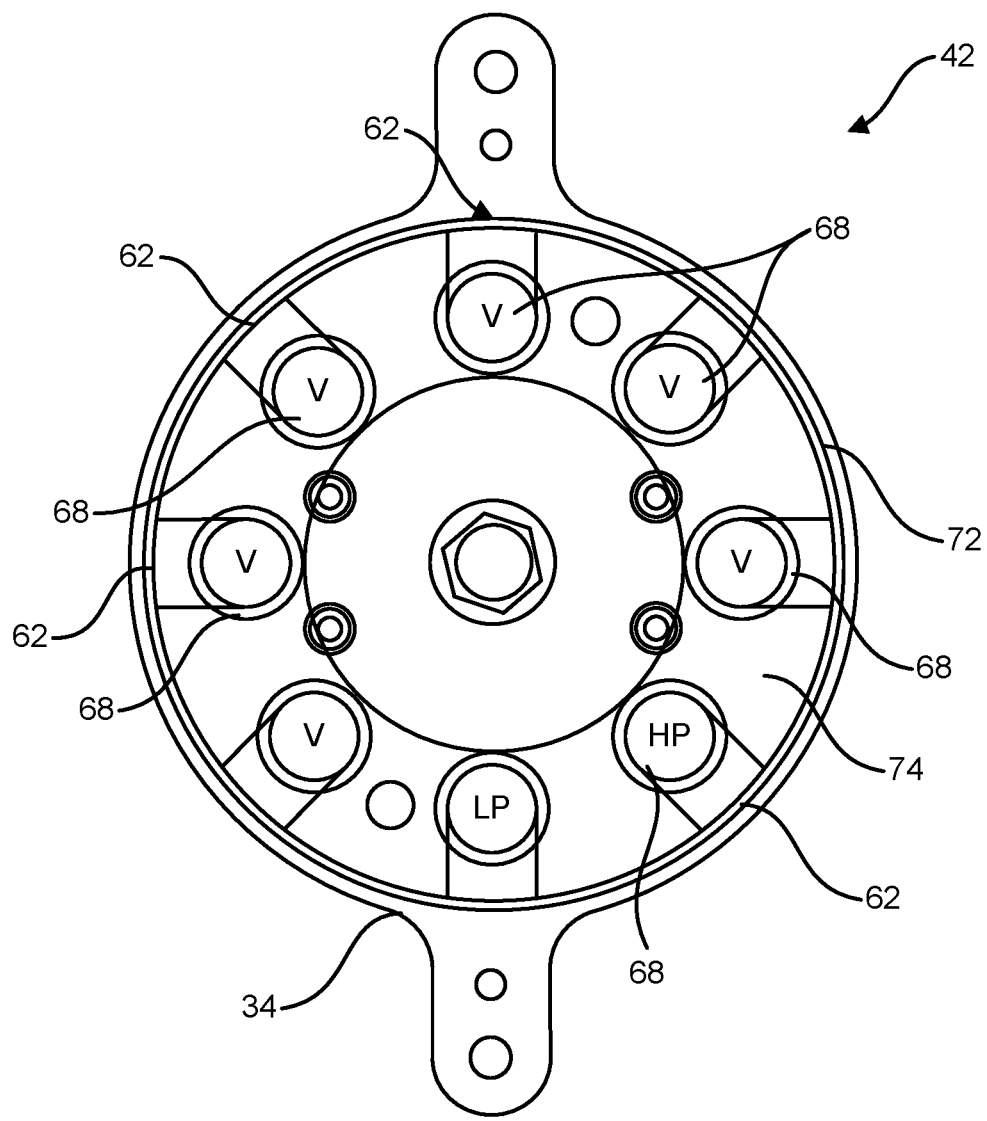
FIG. 8 is a cross section of the vacuum cylinder assembly of FIG. 6.

Referring to FIGS. 7-9, the vacuum cylinder 42 defines a plurality of longitudinal internal channels or passages 68 extending along the length of the vacuum cylinder 42 and angularly spaced apart about the axis of the vacuum cylinder. Each of the longitudinal internal passages 68 is in fluid communication with one of the outlets 58 of the rotary union 40. The seed-holding openings 62 extend through the exterior or circumference of the vacuum cylinder 42 and are arranged in angularly spaced apart rows about the axis of the cylinder, with the seed-holding openings in each row being aligned along the length of the cylinder and in fluid communication with one of the internal passages 68. Thus, the seed-holding openings 62 in each row remain in fluid communication with one of the outlets 58 of the rotary union 40 during rotation of the vacuum cylinder 42. Independent flow paths for each row of seed-holding openings 62 allows for independent timing of each row, as well as tunable timing of the entire planting process. For example, using the controller 11 (e.g., the vacuum controller), a user may select a vacuum initiation at 0 degrees, a seed pickup at 10 degrees, a seed release at 270 degrees, and a debris blow off at 300 degrees. In the illustrated embodiment, the vacuum cylinder 42 defines eight longitudinal internal passages 68 and eight rows of seed-holding openings 62 corresponding to the longitudinal internal passages. There may be any number of longitudinal internal passages 68 and corresponding rows of seed-holding openings 62. Also in the illustrated embodiments, each row includes ten seed-holding openings 62 to correspond with the number of seeds of each row to be planted, although each row may include a different number of seed-holding openings.

In one or more embodiments, the controller 11 is configured to utilize any number of the rows of seed-holding openings 62 for delivering seeds to the seed placement system 200. For example, the controller 11 may be configured to operate the vacuum cylinder assembly 32, such as by utilizing the solenoid valves, to use a first set of four non-adjacent rows of seed-holding openings 62 during one operation and utilize a second set of four non-adjacent rows of seed-holding openings during another operation. In such an embodiment, the seed-holding openings 62 in the first set of rows may have diameters that are less than the seed-holding openings in the second set of rows. In this way, the same vacuum cylinder 42 may be used for seeds having different sizes (i.e., the first set of rows may be used for smaller seeds in a first operation and the second set of rows may be used for larger seeds in a second operation). This allows the same vacuum cylinder 42 to be used for different types of seeds.

Referring to FIGS. 7 and 8, the illustrated vacuum cylinder 42 includes a cylindrical sleeve 72 defining the seed-holding openings 62, and an insert 74 received in the cylindrical sleeve and defining the longitudinal internal passages 68. The cylindrical sleeve 72 may be removable and replaceable with a different cylindrical sleeve, using the same insert 74. For example, a first cylindrical sleeve 72 may be used with the insert 74 when planting a first type of seed, and a second cylindrical sleeve may be used with the insert when planting a first type of seed. The differences in the cylindrical sleeves 72 may be the size and/or shape and/or number of the seed-holding openings 62. In one example, the cylindrical sleeve 72 may comprise (e.g., be formed from) metal, or other material, such as plastic. For example, stainless steel tubing (e.g., 304L stainless steel), such as 16 gauge tubing having an outer diameter measuring 6 in (152.4 mm), may be used. Stainless steel may provide wear and corrosion resistance. The insert 74 may comprise (e.g., be formed from) a plastic material, such as a thermoplastic, or other material. A plastic insert 74 reduces the mass of the vacuum cylinder 42 and may be less costly to make compared to a vacuum cylinder formed from a single, thick-walled one-piece stainless steel cylinder. For example, polycarbonate may be used, although acetal, nylon, polypropylene, PVC, or other plastic material may be used. Factors to consider for the plastic material include, among other factors, strength, impact toughness, and thermal expansion. For example, a material with a high coefficient of thermal expansion may lead to expansion and contraction of the outer diameter of the insert 74, which may lead to expansion and contraction of the inner and outer diameters of the sleeve 72. This may lead to vacuum leaks, reducing the ability of the seed-holding openings 62 to hold onto the seeds. It is understood that the vacuum cylinder 42 may be formed as a one-piece component, such as from a single, thick-walled one-piece stainless steel cylinder or other material.

Referring to FIG. 8, in one example wherein all eight rows of the seed-holding openings 62 are used, the expected condition (vacuum, low pressure, high pressure) is represented by V, LP, and HP for the cylinder position shown in FIG. 8. In this example, the vacuum cylinder 42 is rotating in the counterclockwise direction. The row of seed-holding openings 62 at the 3 o'clock position has a vacuum or negative pressure applied therein. This row of seed-holding openings 62 extracts seeds from the seed source (e.g., seed pan), described below. The following 5 rows of seed-holding openings 62 (moving counterclockwise) have a vacuum or negative pressure applied therein and are holding seeds to be planted as the vacuum cylinder 42 rotates. Some vacuum leakage is expected around the irregularly shaped seeds, and in the case of a missing seed. A conservative assumption of 50% leakage may be used for vacuum valve sizing. Low positive pressure air (or no negative pressure) is applied to the row of seed-holding openings 62 in the 6 o'clock position to release the vacuum and to blow (or release) the seed into the seed delivery system. After releasing the seeds at the 6 o'clock position, high pressure air may be applied to the row of seed-holding openings 62 between the 6 o'clock position and the 3 o'clock position (e.g., in the 4-5 o'clock position) to blow debris from the seed-holding openings before transitioning to vacuum or negative pressure at the 3 o'clock position. It is expected that the row of seed-holding openings 62 in the 3 o'clock has already established a near-full vacuum condition and is ready to, or has already extracted seeds. In one example, the highest vacuum flowrate exists as the solenoid transitions from high pressure air (e.g., about 80 psi) to vacuum over the course of approximately ⅛-cylinder revolution. In one example, the slowest anticipated planting time is 10 rows (1.25 cylinder revolutions) in 7 seconds, or 10.7 revolutions per minute, and the fastest expected planting time is 10 rows in 3 seconds, or 25 revolutions per minute. The transition from high pressure to vacuum is expected to be complete within ⅛ revolution, or 0.7 seconds and 0.3 seconds for the highest and lowest speeds, respectively.

Figure 4:
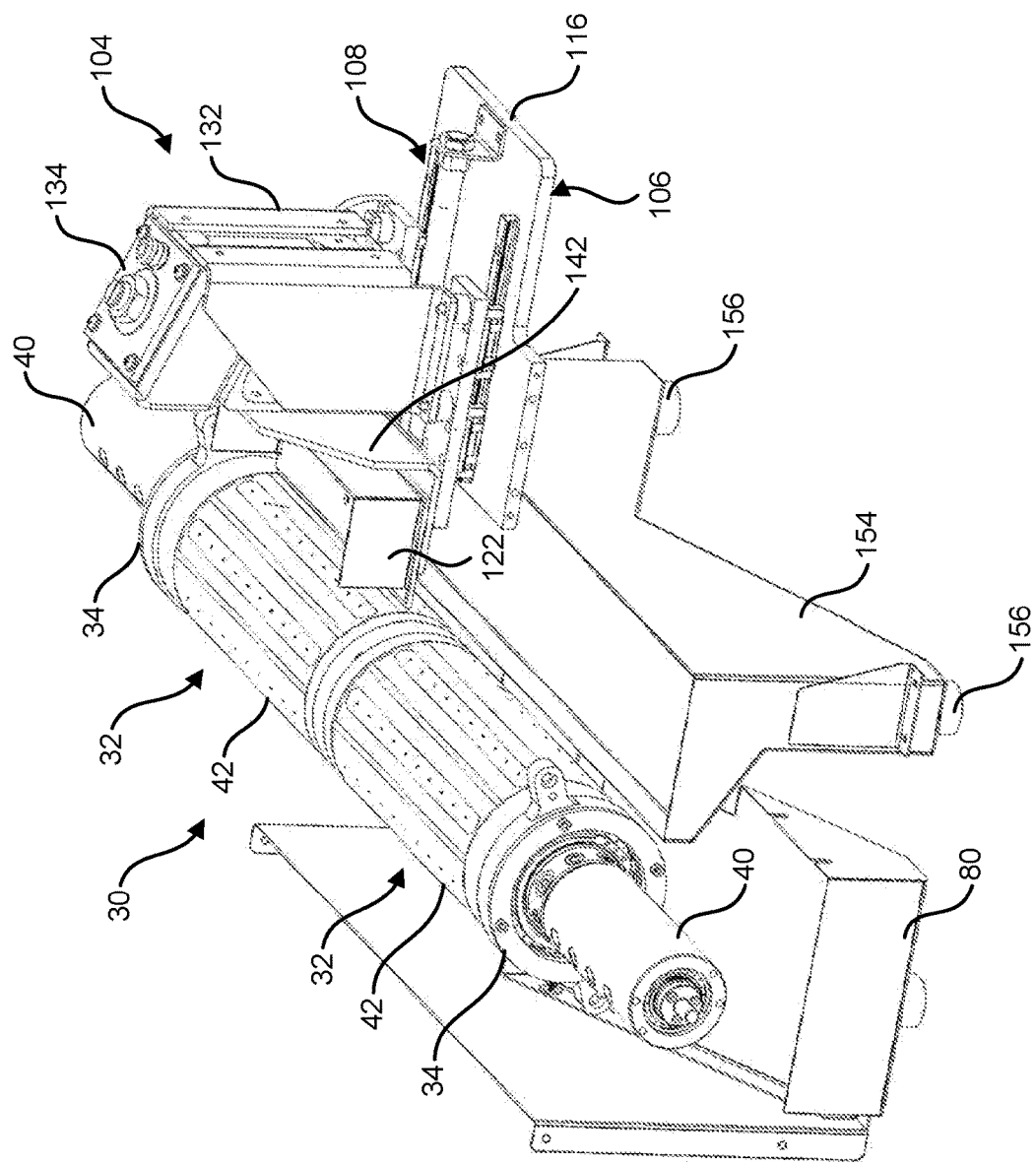
FIG. 4 is a perspective of a pair of vacuum cylinder assemblies, a single seed supply assembly, a seed catch bin, and a seed disposal bin.
Figure 5:
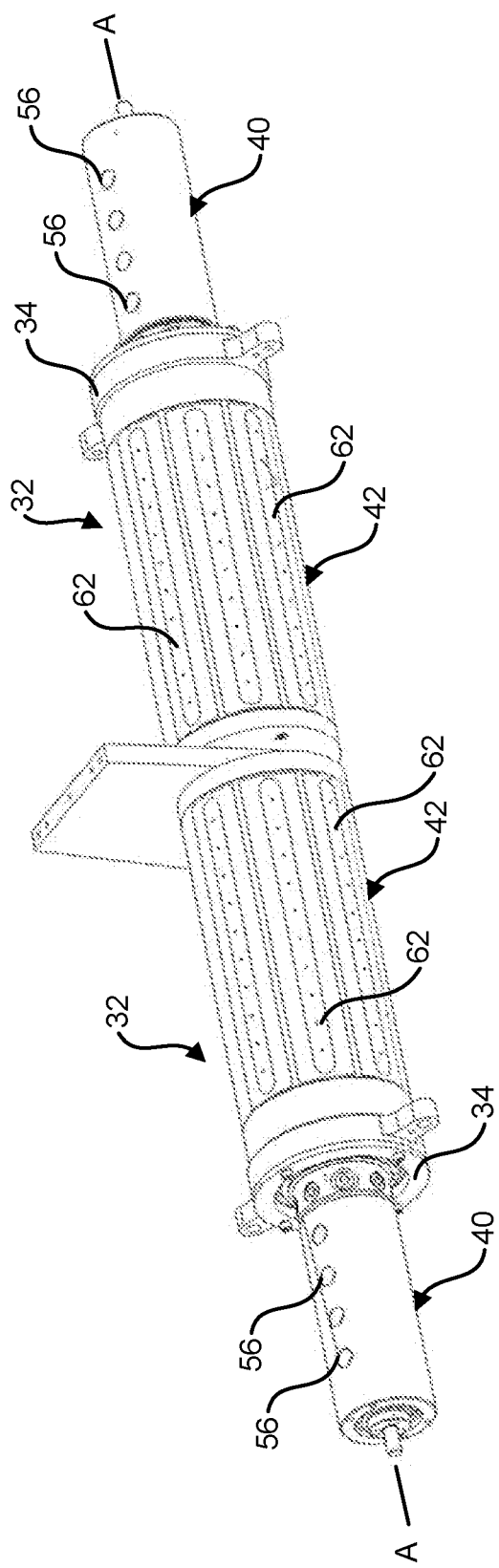
FIG. 5 is a perspective of the pair of vacuum cylinder assemblies.
Figure 6:
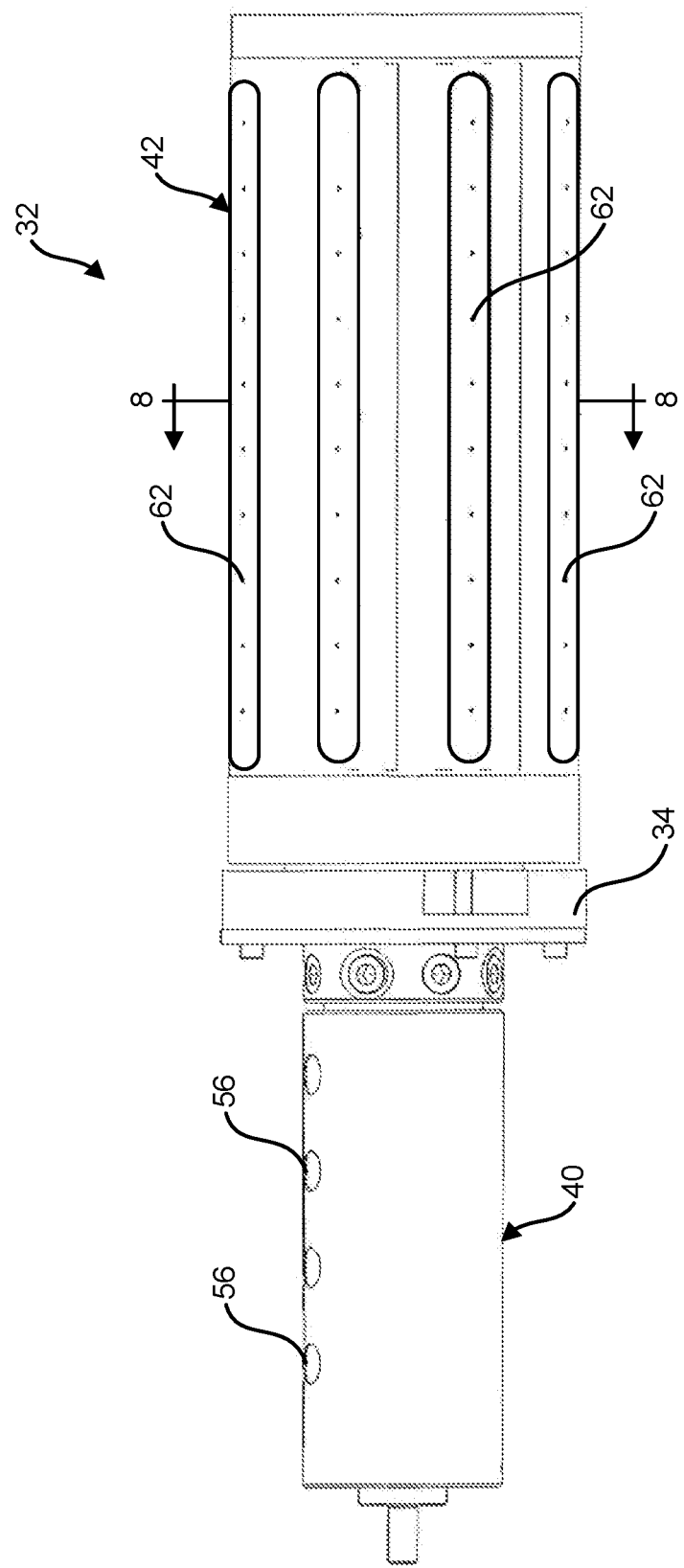
FIG. 6 is a right side elevation of one of the vacuum cylinder assemblies.
Figure 10:
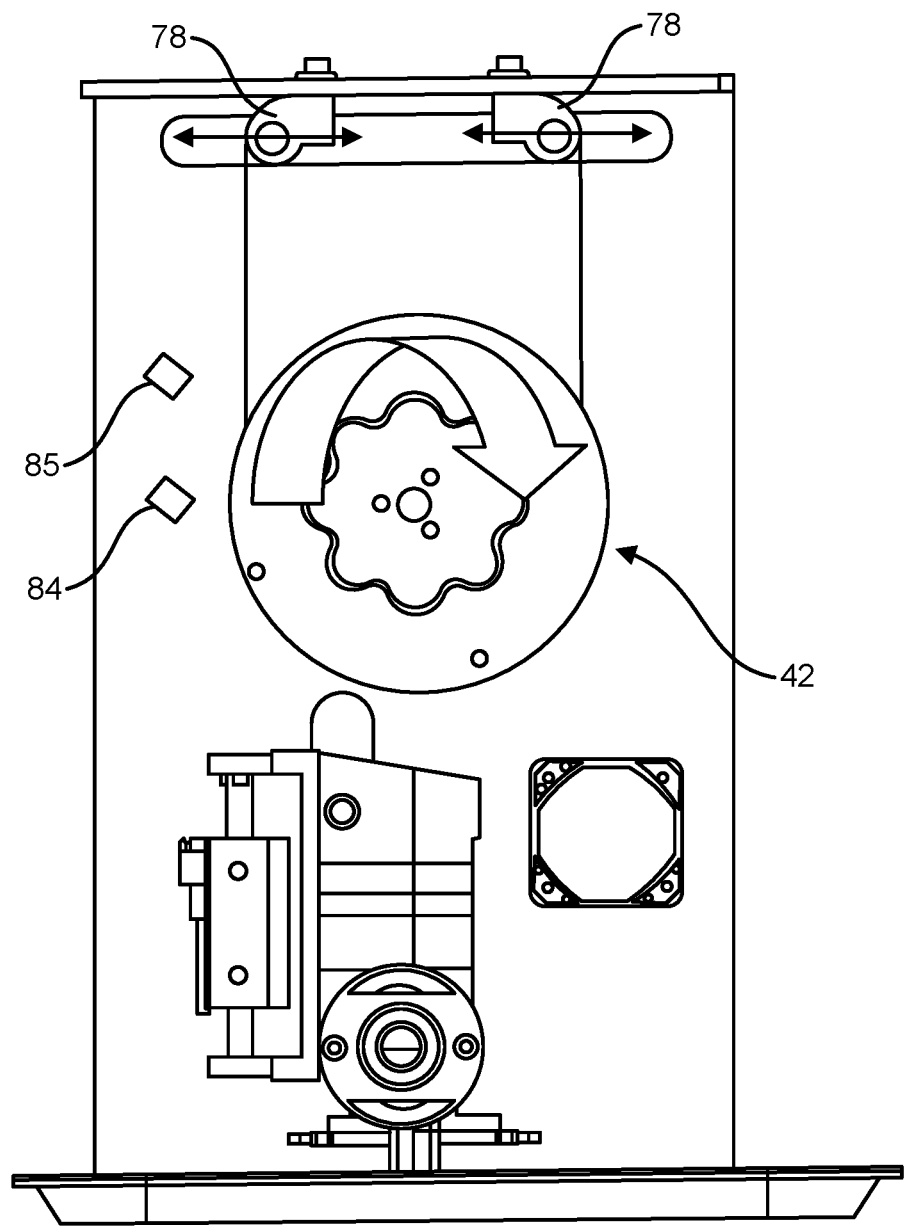
FIG. 10 is a schematic representation of air knives and the vacuum cylinder.

Referring to FIG. 10, in one or more embodiments, positive air flow may be delivered over the exterior of the vacuum cylinder 42 to inhibit more than one seed from being held by each seed-holding opening 62. Referring to FIG. 10, in one embodiment at least one air knife 78 is mounted above the one or more vacuum cylinders 42. In the illustrated embodiment, two air knives 78 are spaced apart above the vacuum cylinders 42. The first air knife 78 is positioned to direct positive air flow across the vacuum cylinders 42 at a location between the 12 o'clock and the 3 o'clock positions. In other words, air flow is applied to each row of seed-holding openings 62 after picking up the seeds and before the row is at its uppermost or 12 o'clock position. Any excess seeds that have been picked up are blown off the vacuum cylinder 42 and fall back into the seed pan. The pressure or force of the air does not overcome the vacuum in each seed-holding opening 62 holding an individual seed so that singulated seeds are not disengaged from the vacuum cylinder. The second air knife 78 is positioned to direct positive air flow across the vacuum cylinders at a location between the 12 o'clock and the 9 o'clock positions. In other words, air flow is applied to each row of seed-holding openings 62 after moving through the uppermost or 12 o'clock position and at or before the 9 o'clock position. Any excess seeds that have been picked up and were not blown off by the first air knife 78 are blown off the vacuum cylinder 42 and fall into a seed catch pan or bin 80 positioned below the vacuum cylinders 42, as shown in FIG. 4. The pressure or force of the air of the air knife 78 does not overcome the vacuum in each seed-holding opening 62 holding an individual seed so that singulated seeds are not disengaged from the vacuum cylinder 42. The air knives 78 may be individually adjustable relative to the vacuum cylinders 42 such as by selectively moving the air knives laterally closer or further from the rotational axes. It is understood that only one air knife 78 may be used, or two or more air knives may be used. It is also understood that one or more of the air knives may be omitted. In one or more embodiments, there may be an additional mechanism for removing excess seeds from the vacuum cylinder 42. In other embodiments, the automated seed planter 10 may not include the air knife 78 or other mechanism for removing excess seeds from the vacuum cylinder.

Referring still to FIG. 10, in one or more embodiments, one or more imaging sensors (e.g., a camera) 84 image the vacuum cylinder(s) 42 to count the seeds on each of the rows of the seed-holding openings 62. For example, one or more imaging sensors 84 may be positioned for each vacuum cylinder 42 to image one of the rows of the seed-holding openings 62 at a selected position after the vacuum cylinder has picked up seeds from the seed pan. In one example, the imaging sensors 84 are positioned to image the rows of the seed-holding openings 62 of the respective vacuum cylinders 42 after passing by the air knife 78 (e.g., the second air knife) and/or immediately before being released into the seed delivery system. Imaging sensors 84 may be positioned at other locations. The data or signal from the imaging sensor(s) 84 is communicated to the controller 11. The controller 11 (or the imaging sensor(s) 84 itself) determines, using imaging detection software, if one or more seeds is missing from the imaged row and if the imaged row has excess seed(s) on the imaged row. In one embodiment, this data is used as an initial or first "check" to see if the proper number of seeds is being picked up by the rows of seed-holding openings 62. In one example, the imaging sensors 84 may be near infrared imaging sensors. In this example, a near infrared light source 85 may be provided to direct near infrared light to the vacuum cylinders. It is understood that the imaging sensors 84 imaging the seeds on the vacuum cylinder(s) 42 may be omitted.

Figure 28:
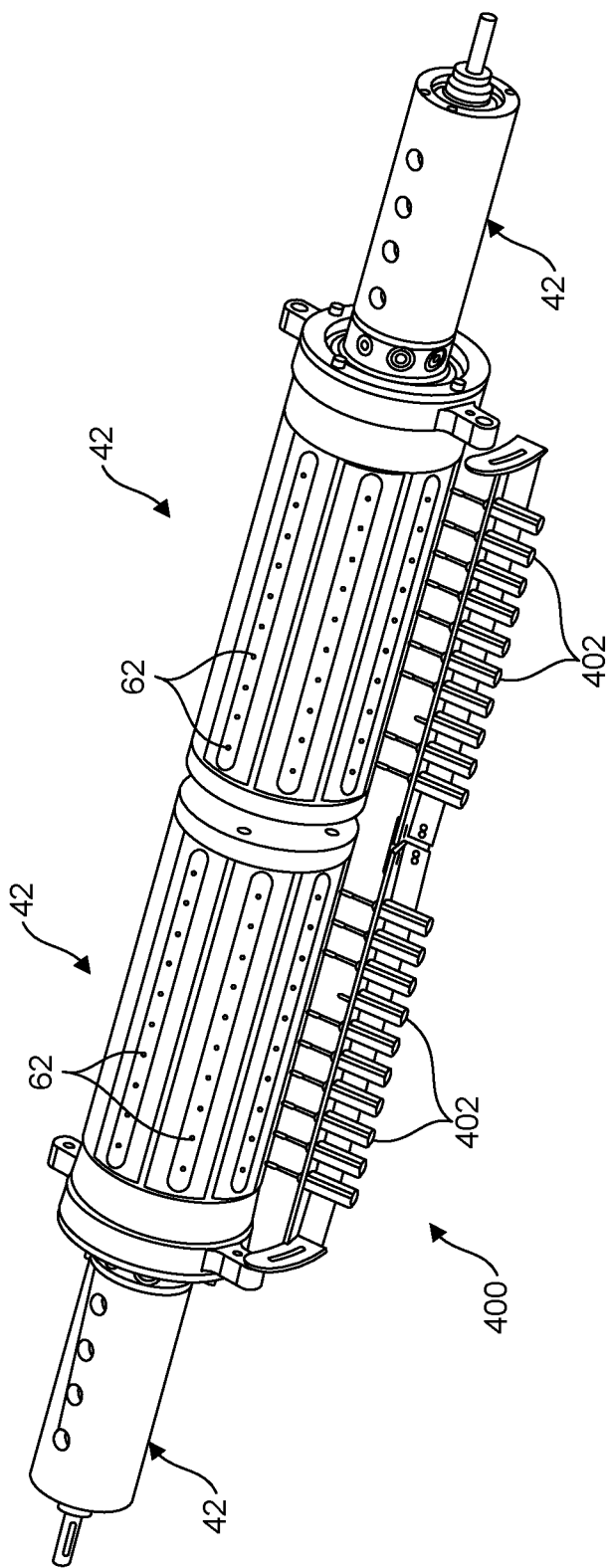
FIG. 28 is a perspective of the vacuum cylinder assemblies of FIG. 5, further including a seed/debris removal system associated with the vacuum cylinder assemblies, two rod cylinders being shown retracted and the remainder of the rod cylinders shown extended.
Figure 29:
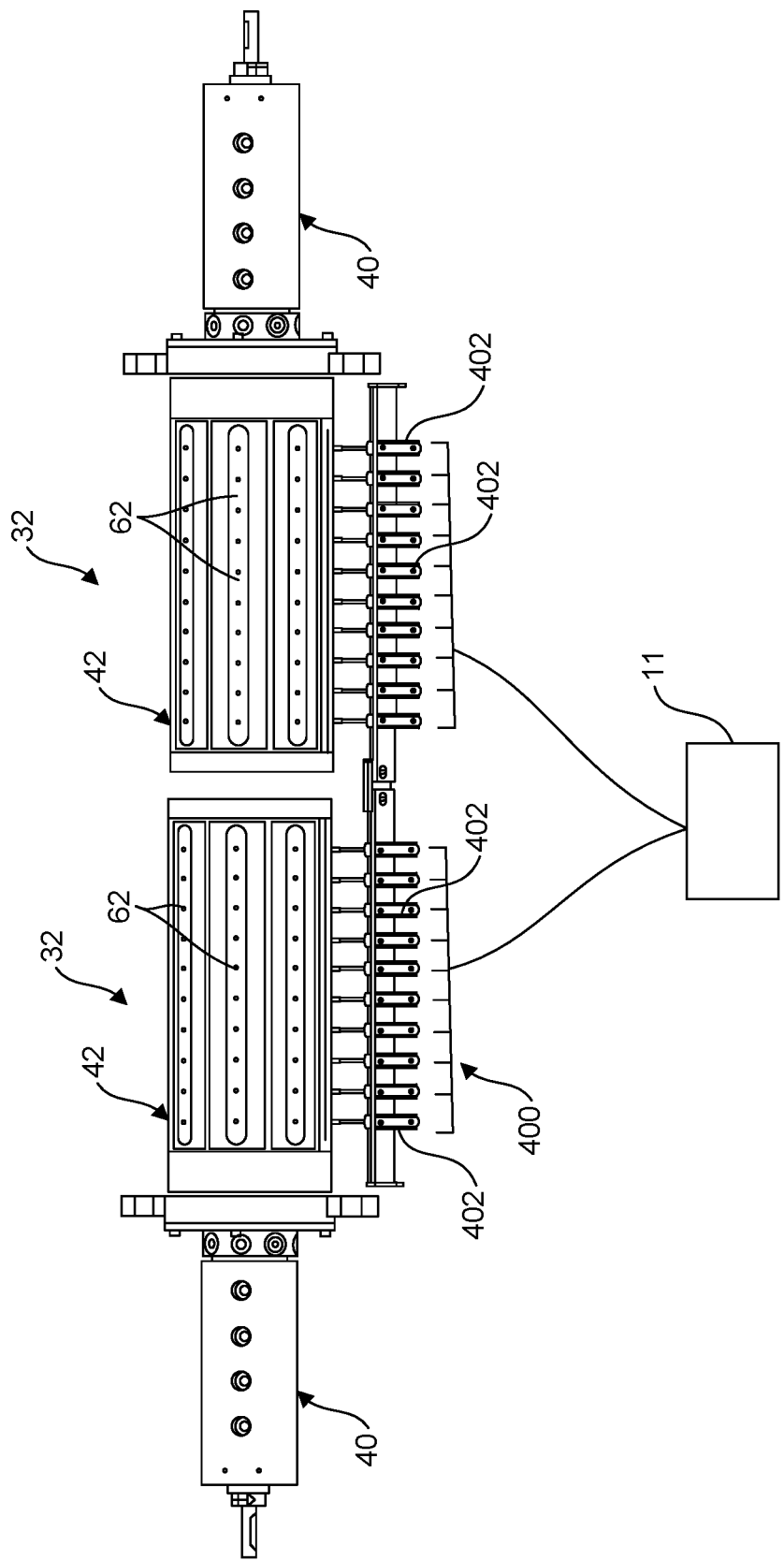
FIG. 29 is a front elevation of FIG. 29, with all of the rod cylinders shown extended.

Referring to FIGS. 28-29, in one example, the automated seed planter may include a seed/debris removal device, generally indicated at 400, in addition to or in lieu of the air knife 78, for removing seeds and/or debris from the vacuum cylinder 42 if the controller 11 determines that more than one seed is associated with one (or more) of the seed-holding openings 62 and/or debris is associated with one (or more) of the seed-holding openings. In one example, the removal device 400 includes a plurality of movable rods 402 (selectively extendable and retractable), each of which is associated with one of the seed-holding openings 62. In particular, each movable rod 402 may comprise a rod cylinder (e.g., a pneumatic cylinder; solenoid) operable by the controller 11 and disposed in a row adjacent the vacuum cylinder 42. Each of the rod cylinders is independently operable by the controller 11. In one example, all of the rod cylinders are initially in their extended positions, whereby the ends of the rod engage the vacuum cylinder or are adjacent the surface of the vacuum cylinder. If the controller 11 determines, based on the signal from the imaging sensors 84, that each of the seed-holding openings 62 is holding one and only one seed and no debris is present, then the controller retracts each of the rod to allow the seeds on the vacuum cylinder to continue on the cylinder (see FIG. 29, for example). If the controller 11 determines, based on the signal from the imaging sensors 84, that one or more of the seed-holding openings 62 is holding more than one seed and/or debris while the other seed-holding openings are holding one and only one seed, then the controller retracts only those rods that are associated with the seed-holding openings holding one and only one seed and the rod(s) associated with the seed-holding openings holding more than one seed and/or debris are retained in the extended position(s) (see FIG. 28, for example). The extended rod(s) knock the multiple seeds and/or debris off of the vacuum cylinder 42 as the cylinder continues to rotate. The vacuum cylinder 42 delivers the remaining seeds to the seed placement system 200. The seed placement system 200 will add any missing seeds, as explained below (e.g., add a seed to a chute), before placing the seeds on the tray.

Seed Supply System

Figure 11:
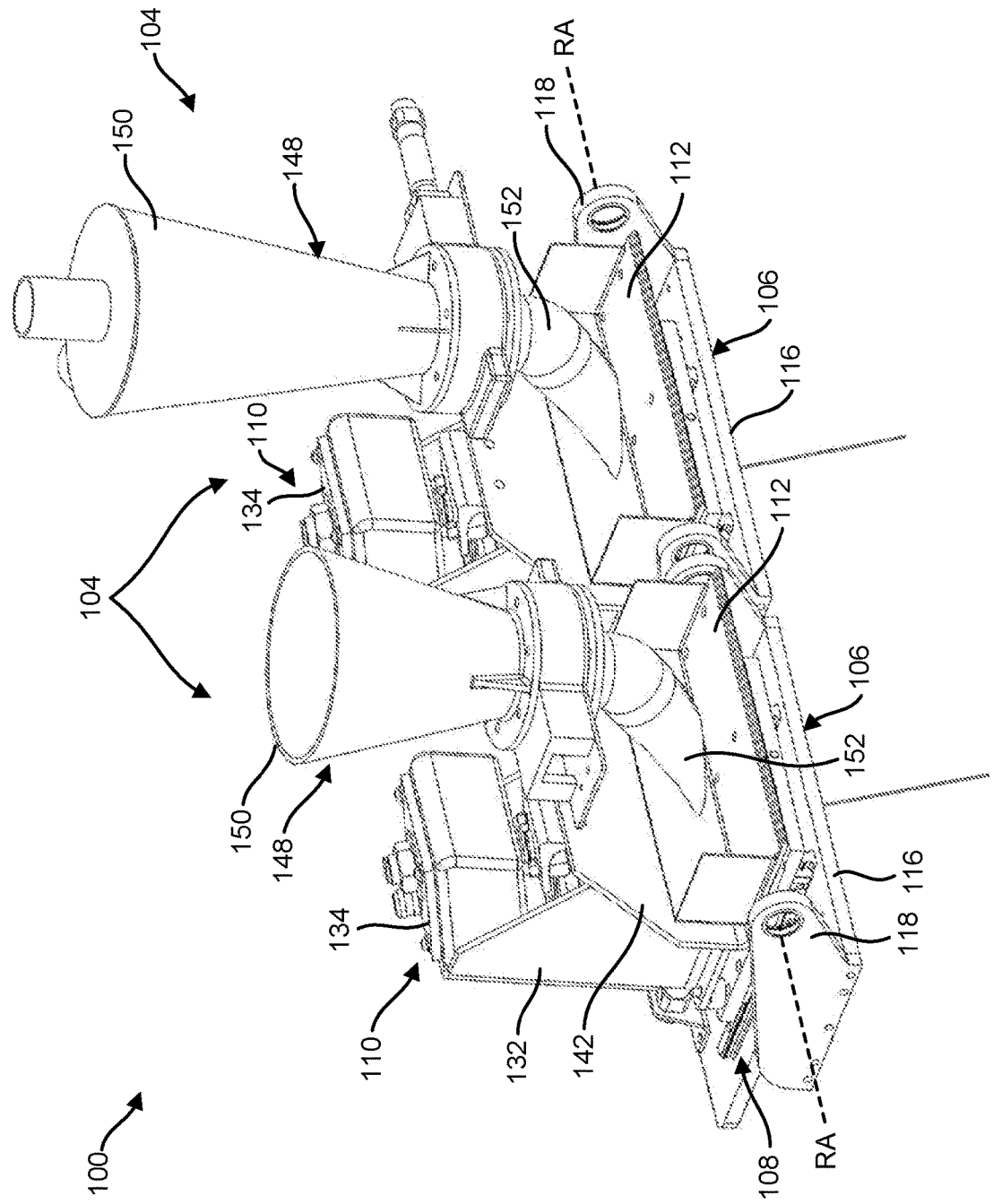
FIG. 11 is rear perspective of a seed supply system including a pair of seed supply assemblies.

Referring to FIGS. 11-14, the seed supply system 100 includes one or more seed supply assemblies 104. In the illustrated embodiment, the seed supply system includes two seed supply assemblies 104, each dedicated to one of the vacuum cylinders 42. In one embodiment, the seed supply system 100 includes two or more seed supply assemblies 104. For example, the number of seed supply assemblies 104 may equal the number of vacuum cylinder assemblies 32. Each seed supply assembly 104 includes a base 106, a slide mechanism 108 coupled to the base, a pan vibrating mechanism 110 coupled to the slide mechanism 108, and a seed pan 112 coupled to the pan vibrating mechanism. The base 106 is hingedly coupled to the structural support 12 for selective rotation about a horizontal axis RA (FIG. 11). The illustrated base 106 includes a bottom plate or mount 116, and opposite lever arms 118 extending upward from the bottom plate. The lever arms 118 are pivotably or hingedly coupled to the structural support 12, such as by a pin and/or bearings, to provide rotation or pivoting of the base (and the seed supply assembly 104 as a whole) about the horizontal axis RA. A pivoting driver 120 (FIGS. 1 and 3) is coupled to the base 106 and imparts rotation or pivoting of the base about the horizontal axis RA. The illustrated pivoting driver 120 comprises a linear actuator, although it may be other powered cylinders (e.g., a pneumatic or hydraulic cylinder). An opposite end of the pivoting driver 120 is coupled the structural support 12. The controller 11 (e.g., the seed supply controller) may be in communication with the pivoting driver 120 to control operation of the pivoting driver, and thus control pivoting of the seed supply assembly 104.

Figure 13:
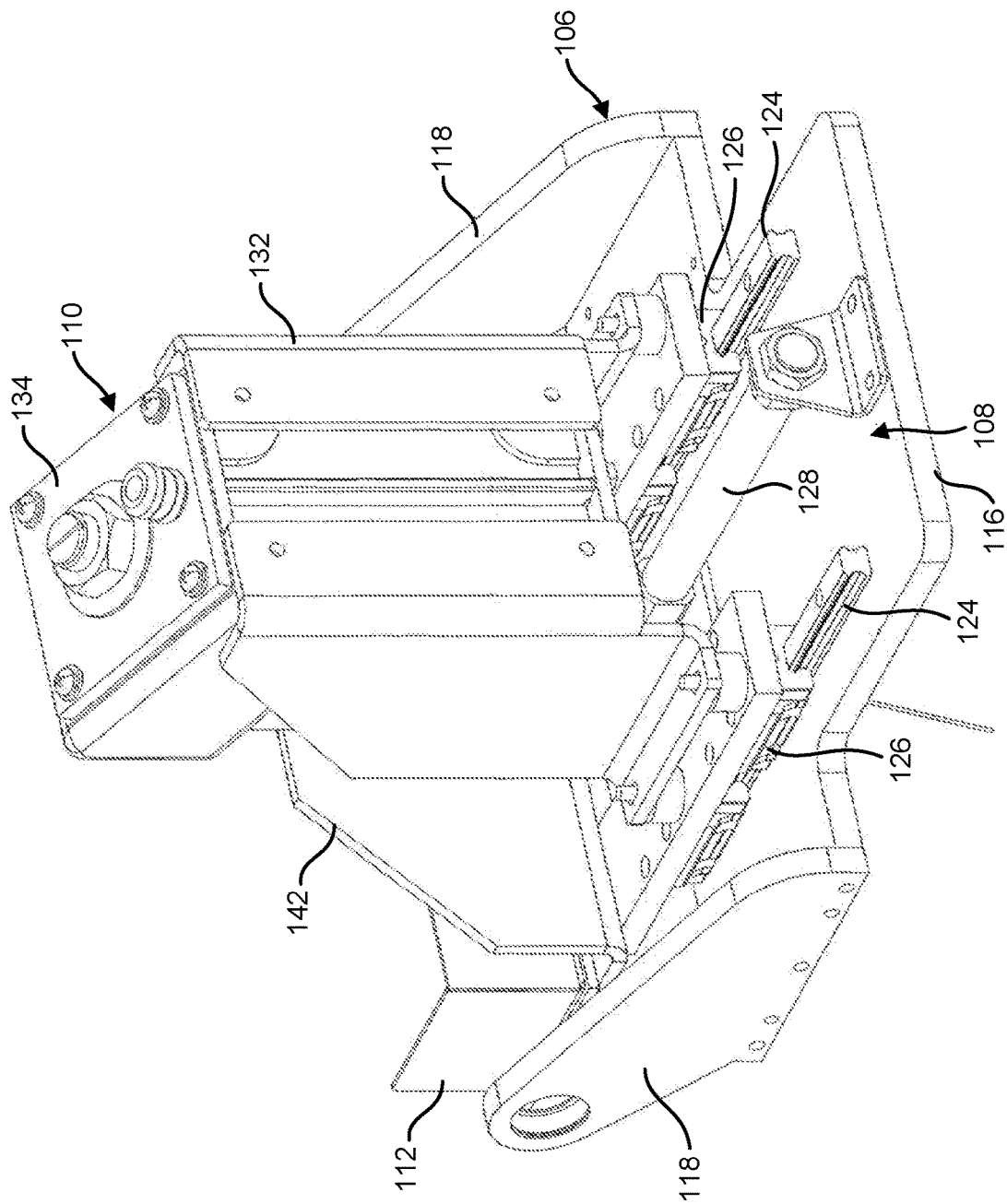
FIG. 13 is a front perspective of one of the seed supply assemblies.
Figure 14:
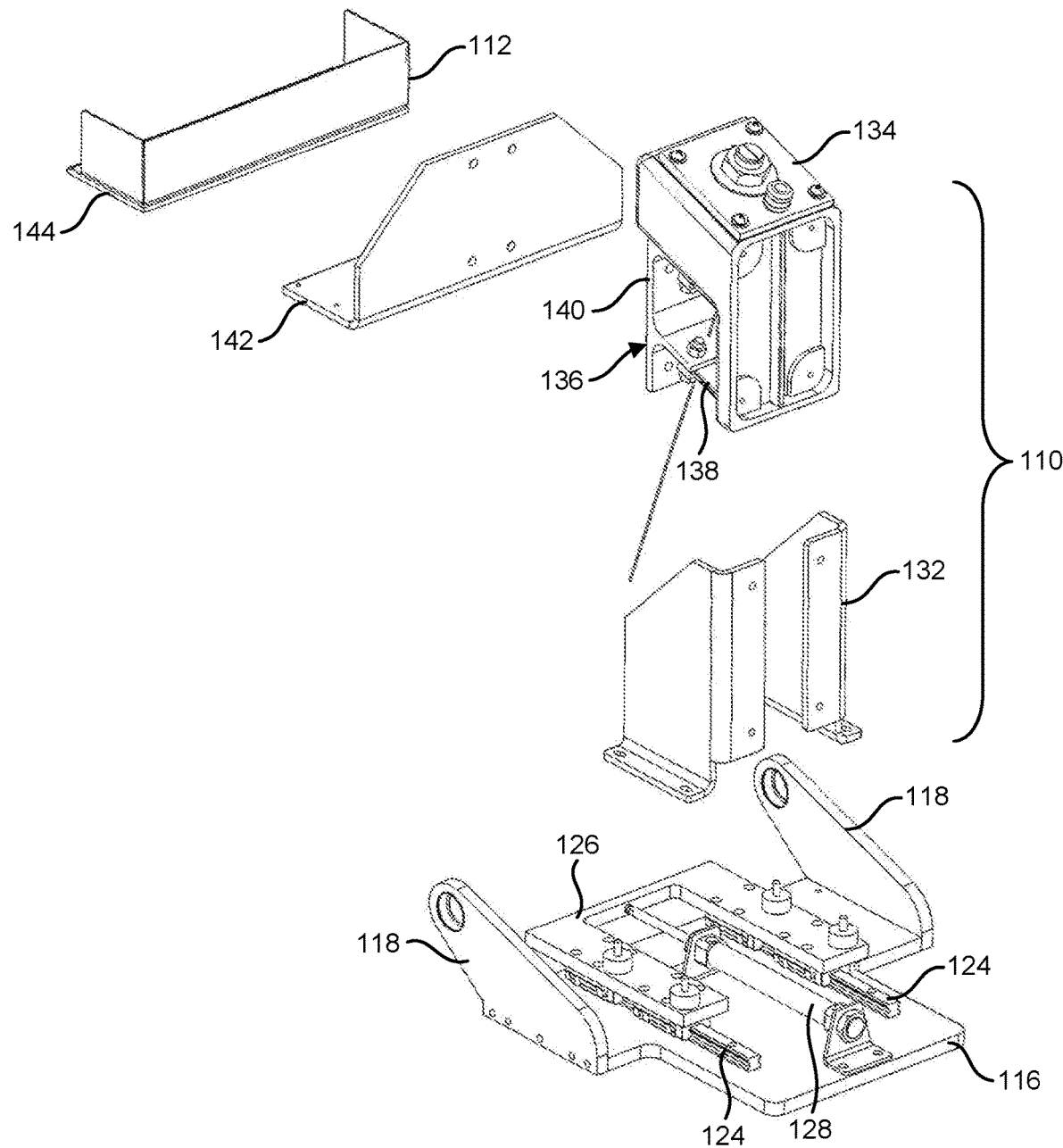
FIG. 14 is an exploded view of the seed supply assembly of FIG. 13.

Referring to FIGS. 13 and 14, the slide mechanism 108 is mounted on the bottom plate 116 of the base 106 and is configured to selectively translate the pan vibrating mechanism 110 and the seed pan 112 relative to the base between a seed-pickup position, adjacent the vacuum cylinder 42, and a seed-disposal position, away from the vacuum cylinder. The slide mechanism 108 includes one or more linear tracks 124 mounted on the bottom plate 116, and one or more sliding blocks 126 slidably coupled to the one or more linear tracks. The pan vibrating mechanism 110 and the seed pan 112 are mounted on the sliding block 126, such that the pan vibrating mechanism and the seed pan move together with the sliding block. In the illustrated embodiment, there is a single, U-shaped sliding block 126 having two legs slidably coupled to two linear tracks 124. A slide driver 128 is mounted on the bottom plate 116 of the base 106 and coupled to the sliding block 126, such as to a crossbar of the U-shaped sliding block. The illustrated slide driver 128 comprises a pneumatic cylinder, although it may be other powered cylinders (e.g., a linear actuator or hydraulic cylinder), for example, or other drivers. The controller 11 (e.g., the seed supply controller) may be in communication with the slide driver 128 to control operation of the slide driver, and thus control translation or sliding of the sliding block 126, as described below.

Figure 12:
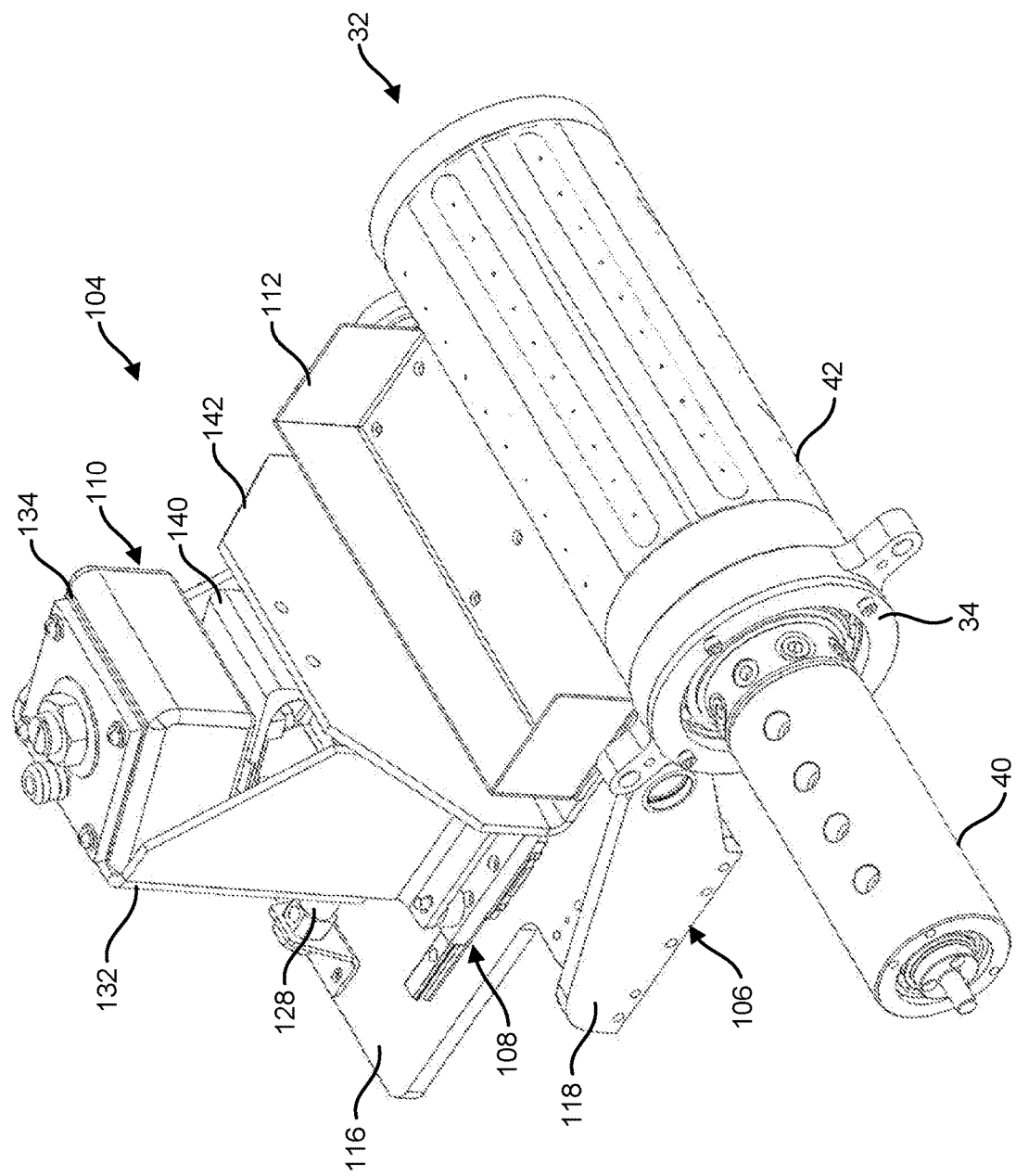
FIG. 12 is an enlarged rear perspective of one of the seed supply assemblies and one of the vacuum cylinder assemblies in association therewith.

Referring still to FIGS. 13 and 14, the pan vibrating mechanism 110 includes a mounting bracket 132 mounted on the sliding block 126. A vibrating assembly 110 is coupled to the mounting bracket 132. The pan vibrating assembly 110 includes a vibrator 134, and a vibration transmission assembly 136 coupled to the vibrator 134. The vibration transmission assembly 136 includes a one or more leaf springs 138 coupling the vibrator 134 to a bracket 140. The bracket 140 is in turn secured to a seed pan holder 142 (e.g., and L-shaped bracket), on which the seed pan 112 is coupled (e.g., mounted). A dampening pad 144 may be disposed between the seed pan 112 and the seed pan holder 142. In general, vibrations imparted by the vibrating assembly are transmitted to the seed pan. As shown in FIG. 12, the seed pan 112 has an open top for receiving seeds, and an open front to allow the vacuum cylinder to pick up the seeds from within the pan.

Referring to FIG. 11, in addition to the seed supply assemblies 104, the illustrated seed supply system includes a seed feeding assembly 148 for each of the seed supply assemblies. Each of the illustrated seed feeding assembly 148 includes a seed hopper 150 mounted on the structural support 12 above the seed pan 112. The seed hopper 150 is configured to receive seeds, such as by pneumatically, automatically, or manually delivering the seeds into the seed hopper. A tube 152 or other conduit extends from the seed hopper 150 and directs seeds from the seed hopper into the seed pan 112. A valve may be disposed between the seed hopper 150 and the tube 152 to control the flow of seeds into the seed pan 112. This valve may be operated or controlled by the controller 11 (e.g., the seed supply controller).

In an exemplary operation, the seed supply assemblies 104 are operated independent of one another. The seeds in the hoppers 150 are delivered into the respective seed pans 112 when the seed pans are empty (e.g., after prior batches of seeds has gone through the seed planter 10). In this loading operation, the seed pans 112 are in the extended or seed-pickup position. While the seed pans 112 are in the seed-pickup position and loaded with seeds, the vacuum cylinders 42 pick up the seeds and deliver them to the seed delivery system 30, as described above and further described below. During this operation, the pans 112 are vibrated using the vibration mechanisms 110 to facilitate the vacuum cylinders 42 to pick up and singulate the seeds. For example, the pans 112 may be vibrated at high frequency, low amplitude vibrations generally perpendicular to the vacuum cylinder 42 rotational axis A. The pans 112 may also be pivoted or tilted upward and toward the vacuum cylinders 42, independently, using the pivoting drivers 120 to maintain constant seed level in the pans. After completing delivering of the seeds using the vacuum cylinders 42, the seed pan 112 is retracted to the seed-disposal position using the slide driver 128. In the seed-disposal position, the seed pans 112 are pivoted or tilted upward such that the seeds fall out the open front of the seed pans and into a disposal bin 154 that is disposed below the seed pans. The disposal bin 154 may include exit chutes 156 (FIG. 3) to pneumatically carry the disposed seeds away from the seed planter 10. After emptying the seeds from the seed pans 112, the seed pans are moved to the seed-pickup position and are ready to receive additional seeds for an additional run of the seed planter 10.

Seed Placement System With Autocorrecting

Referring to FIGS. 15-18, the seed placement system 200 is configured to place seeds in spaced apart rows on the trays on the tray conveyor 20. In addition to placing the seeds in rows on the trays, the seed placement system 200 is configured to determine if the correct number of seeds are ready to be placed in each row and correct the numbers of seeds if the row is missing one or more seeds to be placed. In general, the seed placement system 200 includes a seed placing assembly 202, a seed correction assembly 204, and the controller 11 (e.g., seed placement controller) for controlling operations of the seed placement system. The seed placing assembly 202 is configured to place the seeds in rows on the tray as the tray moves past the seed placing assembly on the tray conveyor 20. The seed correction assembly 204 is configured to add one or more missing seeds to the seed placing assembly 202 so that the proper number of seeds in each row are placed on the trays. The controller 11 (e.g., the seed placement controller) is configured to control operations of the seed placing assembly 202 and the seed correction assembly 204.

Referring to FIGS. 17-21, the seed placing assembly 202 includes a seed chute assembly 206 including vertical seed chutes 210 disposed below the vacuum cylinders 42. The illustrated seed chutes 210 are disposed in first and second sets (e.g., left and right sets), with the first set associated with and disposed below the first vacuum cylinder 42 and the second set is associated with and disposed below the second vacuum cylinder. In the illustrated embodiment, the seed chutes 210 are integrally formed or connected to one another and spaced apart from one another in a crosswise direction relative to the travel direction of the tray conveyor belt 22. The illustrated seed chute assembly 206 includes a chute body 212 defining a plurality of vertical chute channels, and a chute cover 214 covering the open front of the chute body. Open upper ends 216 of the chutes 210 are vertically aligned with respective seed-holding openings 62 of the vacuum cylinder 42 and are configured to receive the seeds from the vacuum cylinders as the seeds fall from the vacuum cylinders when releasing the vacuum and/or applying a low positive pressure through the seed-holding openings, as described above. During release of the seeds from the vacuum cylinder 42, each of the seeds enters one of the chutes 210 and travels down to open lower ends 218 of the chutes.

At least one shutter assembly 222 is associated with the lower ends 218 of the chutes 210. In the illustrated embodiment, first and second shutter assemblies 222 are associated with the respective first and second sets of the chutes 210. Each shutter assembly 222 includes a movable barrier 224 (e.g., a plate) and a barrier driver 226 coupled to the barrier and in communication with the controller 11 (e.g., seed placement controller) for controlling operation of the shutter assembly. The barrier 224, via track pins, and the barrier driver 226 are coupled to a shutter mount 228, which is coupled to the chute assembly (e.g., the chute cover). The barrier 224 is movable between a first position, in which the barrier covers the respective lower ends 218 of the chutes 210 to inhibit seeds from exiting the chutes (see, e.g., left barrier in FIG. 18), and a second position, in which the barrier uncovers and opens the respective lower ends of the chutes to allow the seeds to exit the chute and be placed on the seed tray (see, e.g., right barrier in FIG. 18). The illustrated barrier driver 226 comprises a pneumatic cylinder, although it may be other powered cylinders (e.g., a linear actuator or hydraulic cylinder). One end of the barrier driver 226 is coupled to the shutter mount 228 and an opposite end of the barrier driver 226 is coupled to the barrier 224, such as extending the barrier driver 226 opens the barrier and retracting the barrier driver closes the barrier. The controller 11 (e.g., the seed placement controller) may be in communication with the barrier driver 226 to control operation of the barrier driver, and thus control opening and closing of the seed chutes 210, as described below.

Referring still to FIGS. 17-20, to confirm that a seed is in each chute 210 before opening the barrier 224, each chute has an associated image sensor 232 adjacent the barrier. For example, the sensors 232 may comprise photoelectric sensors. The sensors may be mounted on the shutter mount, as illustrated. The controller 11 (e.g., the seed placement controller) may be in communication with the sensors 232 to receive data relating to whether a seed is detected in each individual chute 210.

The seed placing assembly 202 includes a chute driver 234 for vertically moving the chute assembly 206 (or a portion thereof, such as described below) from a first, upper position (FIG. 18) to a second, lower position. In the first, upper position, the lower ends 218 of the chutes 210 disposed a suitable distance above the tray conveyor 20 to allow a tray conveyed by the conveyor belt 20 to be disposed below the lower end of the chute assembly. In the second, lower position, the lower ends 218 of the chutes 210 are moved closer to the tray to facilitate proper placement of the seeds on the tray. The illustrated chute driver 234 comprises a pneumatic cylinder, although it may be other powered cylinders (e.g., a linear actuator or hydraulic cylinder). One end of the chute driver 234 is coupled to the chute assembly 206 by a bracket, and the other end is coupled to the seed correction assembly. Extending the chute driver 234 moves the chute assembly 206 to the first, upper position, and retracting the chute driver moves the chute assembly to the second, lower position. The controller 11 (e.g., the seed placement controller) may be in communication with the chute driver 234 to control operation of the chute driver, and thus control lowering and raising the chute assembly 206 during operation, as explained in more detail below. The seed correction assembly 204 is disposed adjacent the seed placing assembly 202 and is configured to add one seed to any of the chutes 210 during any row planting operation. The seed correction assembly 204 generally includes a seed correction body 238, a plurality of seed wells 240, at least one seed well conveyor 242, and at least one seed displacement system 243.

Figure 18:
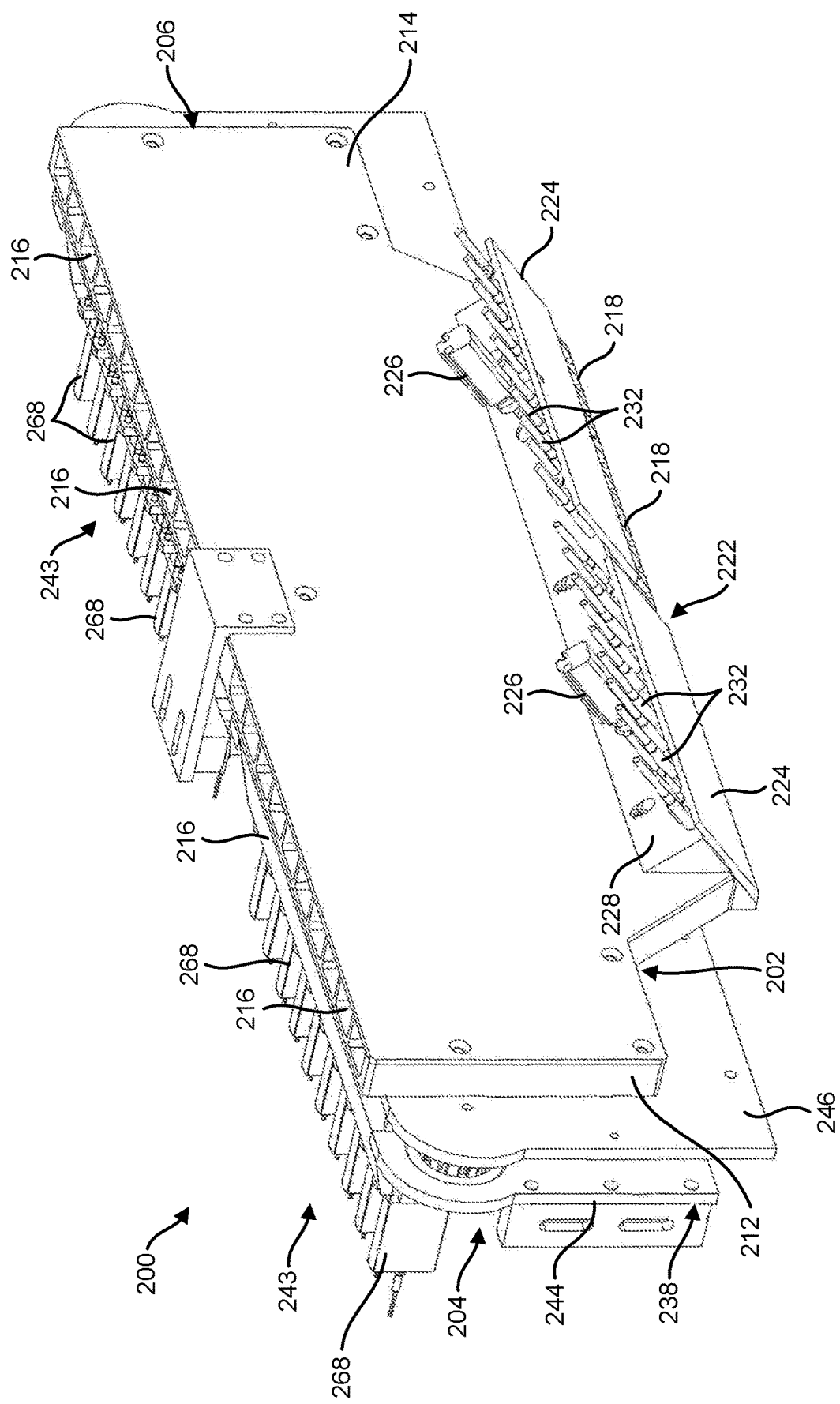
FIG. 18 is an enlarged front perspective of the seed placement system.
Figure 20:
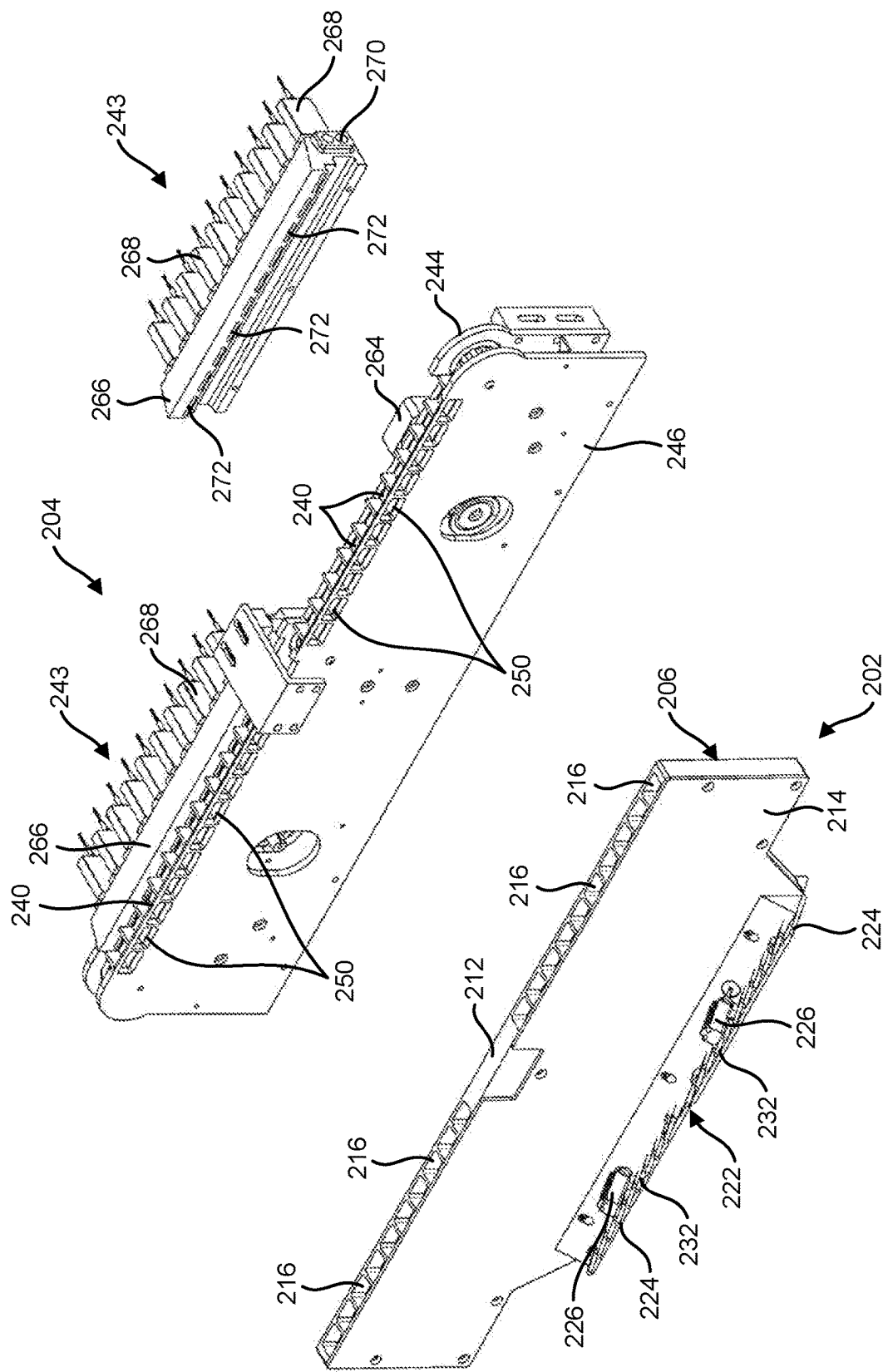
FIG. 20 is an exploded front perspective of the seed placement system.
Figure 21:
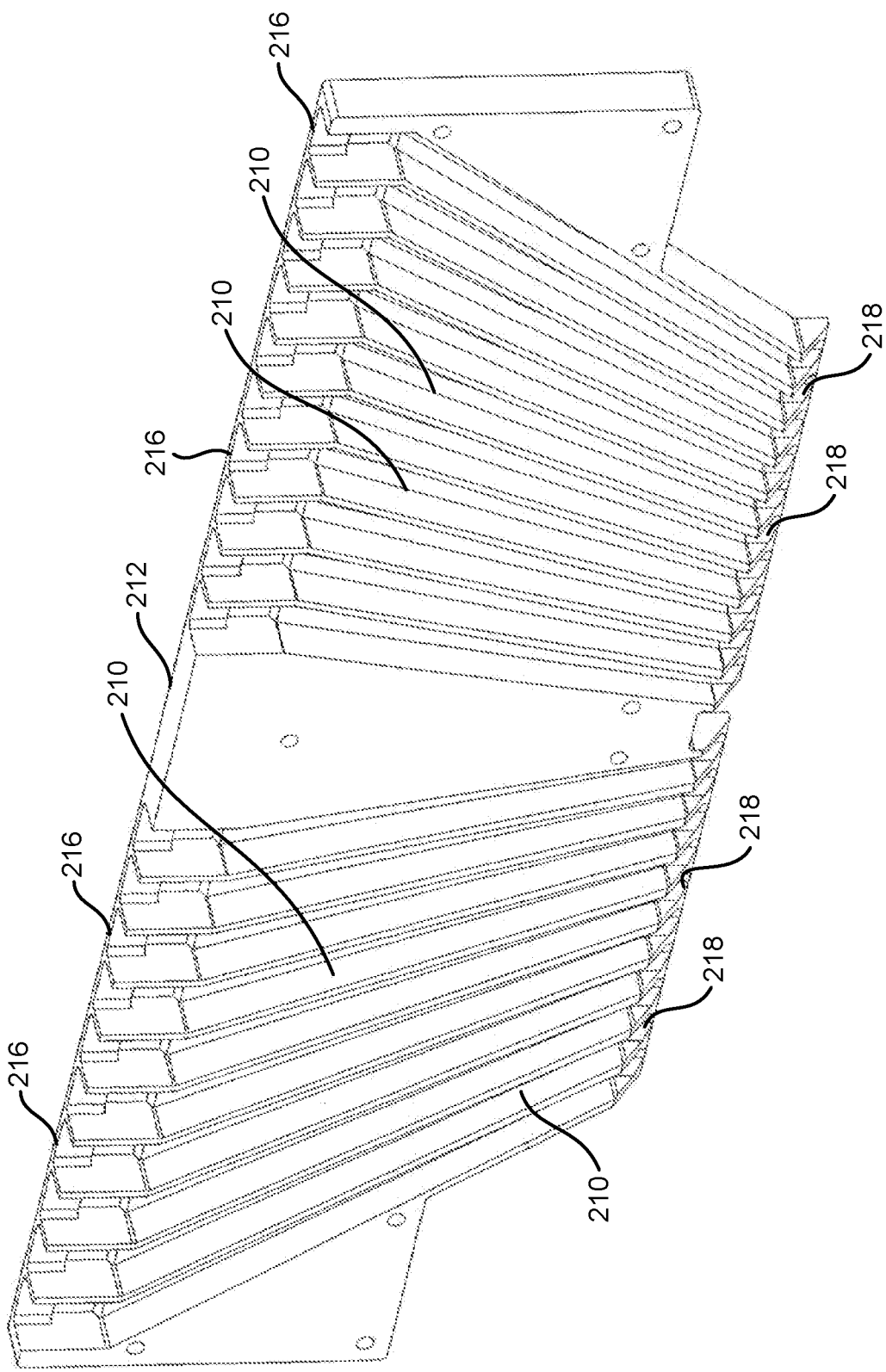
FIG. 21 is a front perspective of a chute body of the seed placement system.

Referring to FIGS. 18-20, the illustrated seed correction body includes opposite first and second side walls 244, 246 (e.g., first and second plates) spaced apart from one another in the direction of the tray conveyor 20. The second side wall 246 of the seed correction body 238 is adjacent to and generally opposes the chute body 212. The upper end of the seed correction body 238 is open to expose the seed wells 240. The chute driver 234 (e.g., the linear actuator) is mounted on the first wall 244. The second wall 246 defines a plurality of openings 250 extending horizontally along the second plate adjacent the upper end of the seed correction body. Each opening 250 is alignable and in communication with one of a plurality of side openings 254 of the chute assembly 206 when the chute assembly is in the upper position. Each side opening 254 of the chute assembly 206 extends through the chute body 212 and is in communication with one of the chutes 210. When the chute assembly 206 is in the lower position, the openings 250 are blocked or closed by the chute body 212 and are not in registration with the respective side openings 254 of the chute assembly 206.

The seed wells 240 are disposed between the first and second side walls 244, 246 adjacent the upper end of the seed correction body 238. The illustrated seed wells 240 are disposed in first and second sets that are independent of one another. The seed wells 240 have open upper ends and are spaced apart from one another in a row extending generally transverse to direction of the tray conveyor 20. Each seed well 240 is sized and shaped to hold a single seed. As explained below, the seed wells 240 are alignable horizontally with the openings 250 in the second side wall 246, and therefore, alignable to be in communication with the side openings 254 of the chute body 212.

Figure 22:
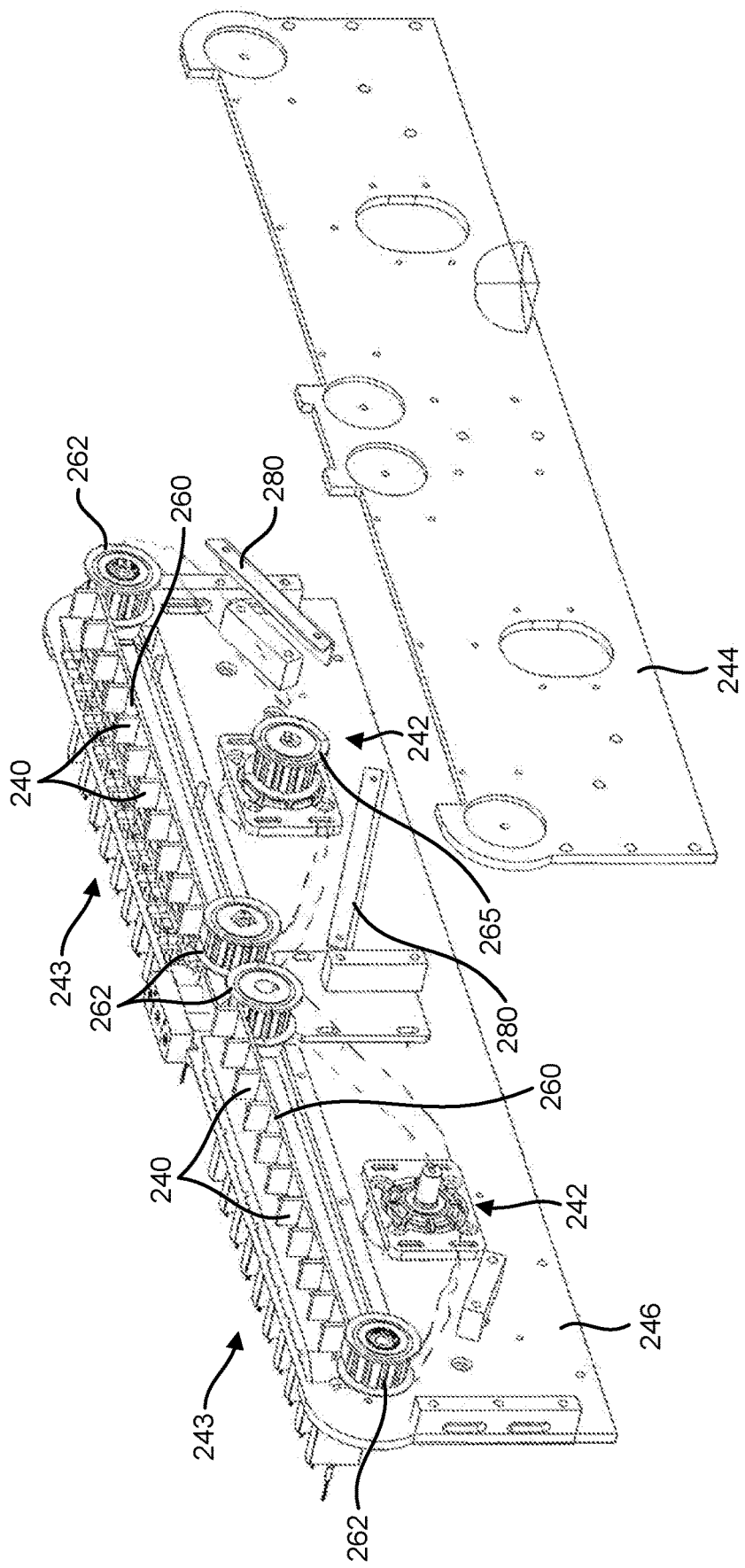
FIG. 22 is an exploded front perspective of a seed correction assembly of the seed placement system.
Figure 23:
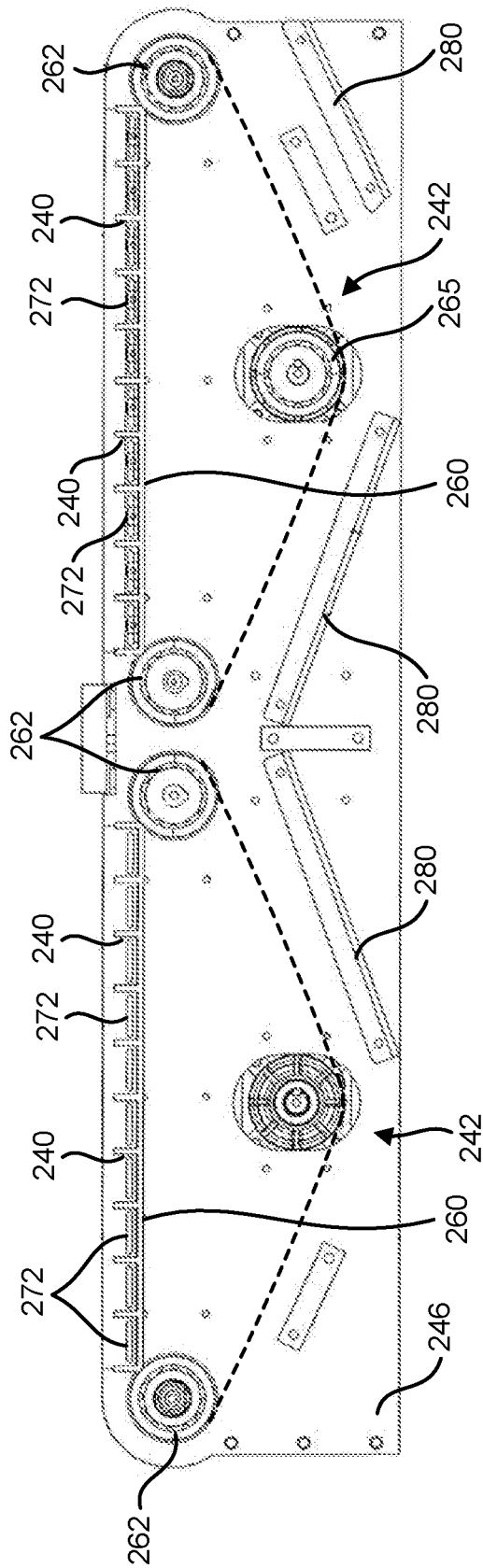
FIG. 23 is a right side elevation of a second side wall of a seed connection body of the seed correction assembly showing a pair of seed well conveyors.

Referring to FIGS. 20, 22, and 23, in the illustrated embodiment, the seed wells 240 are coupled to or part of the at least one seed well conveyor 242. The illustrated embodiment includes first and second seed well conveyors 242. The first seed well conveyor 242 is associated with the first set of seed wells 240, and the second seed well is associated with the second set of seed wells. Each seed well conveyor 242 selectively moves the seed wells 240 horizontally in the direction transverse to the direction of the tray conveyor 20 to adjust the alignment of the seed wells with the openings 250 in the second side wall 246. Each of the illustrated conveyors 242 includes a conveyor belt 260 defining the plurality of the seed wells 240, opposite side rollers 262 on which the belt is received, and a conveyor driver 264 (e.g., an electric motor) configured to drive movement of the conveyor belt. The controller 11 (e.g., the seed placement controller) may be in communication with the conveyor driver 264, including a driving roller 265, to control operation of the conveyor driver, and thus control the positions of the seeds wells 240 relative to the openings in the second side wall 250, as described below.

The seed displacement assembly 243 is configured to selectively move or displace one or more of seeds from the respective seed wells 240, through the respective opening 250 in the second side wall 246, through the side opening 254 and into the associated chute 210. The illustrated seed displacement assembly 243 is configured to deliver a puff or impulse of air or other gas into a selected one of the seed wells 240 to displace the seed in a direction transverse to the direction of the seed well conveyor belt 260. The seed displacement assembly 243 includes a source of pressurized gas (e.g., an air compressor; not shown), a pneumatic manifold 266 in communication with the source of pressurized gas, and a valves 268 (e.g., solenoid valves) in communication with the manifold. The pneumatic manifold 266 is secured to the first side wall 244 of the seed correction body 238. Each valve 268 is in fluid communication with a main internal passage 270 (FIG. 20) in the manifold 266 and are selectively operable to deliver pressurized gas into a dedicated outlet 272 (FIG. 23). Although the illustrated embodiment shows the valves 268 mounted on the manifold 266, in another embodiment the valves may be located away (i.e., remote) from the manifold, and dedicated, individual tubing or plenums may fluidly connect the valves to the corresponding dedicated outlets 272 of the manifold 266. Each dedicated outlet 272 delivers pressurized gas into a selected one of the seed wells 240. The outlet 272 flares generally toward the seed well 240. The controller 11 (e.g., the seed placement controller) may be in communication with the valves 268 to control operation of the seed displacement assembly 243, and thus move a seed from a selected one of the wells 240 into the associated chute 210.

In an exemplary operation, the seed chute assembly 206 is in an upper position, and a seed tray is conveyed under the seed chute assembly. The seed chute assembly 206 is then moved to the lower position. With the seed chute assembly 206 in the lower position, a makeup row of seeds picked up by the vacuum cylinder 42 is placed (e.g., dropped) into the seed wells 240 of the seed well conveyor 242. Thus, each seed well 240 has a seed in it. After the seed wells 240 are filled, the vacuum cylinder 42 delivers a first plantable row of seeds into the seed chutes 210. The seeds fall to the lower ends 218 of the chutes 210, and are held in the chutes by the shutter assembly 222, which is closed. The imaging sensors 232 send signals to the controller 11 to determine if the associated chutes 210 each includes a seed. If each of the chutes 210 includes a seed, the controller 11 operates the barrier driver 226 to open the lower ends 218 of the chutes 210 so that the seeds fall onto the tray in a row. If one or more of the chutes 210 does not include a seed, the controller 11 operates the seed correction assembly 204 to move the seed correction body into the upper position and operates the seed displacement assembly 243 deliver a puff or impulse of air into the seed well associated with the chute missing a seed to displace the seed into the chute. The controller 11 then confirms that the seed was delivered into the chute 210 and that each chute includes a seed using the signals from the imaging sensors 232. After confirming the chutes 210 have seeds, the controller 11 operates the barrier driver 226 to open the barriers 224 so that the seeds fall through the lower ends 218 of the chutes and onto the tray in a single row.

After planting the first row, the tray is moved a selective distance forward using the tray conveyor 20. The vacuum cylinder 42 delivers a second plantable row of seeds into the seed chutes 210. The seeds fall to the lower end of the chutes 210, and are held in the chutes by the shutter assembly 222, which is closed. The imaging sensors 232 send signals to the controller 11 to determine if the associated chute 210 includes a seed. If each of the chutes 210 includes a seed, the controller 11 operates the barrier driver 226 to open the lower ends 218 of the chutes 210 so that the seeds fall onto the tray in a second row. If one or more of the chutes 210 does not include a seed, the controller 11 operates the seed correction assembly 204 to move the seed correction body into the upper position and operates the seed displacement assembly 243 deliver a puff or impulse of air into the seed well associated with the chute missing a seed to displace the seed into the chute. If the seed well 240 missing a seed is the same seed well that was previously missing a seed (thus the seed well does not include a seed), the controller 11 operates the seed well conveyor 242 to move a well that includes a seed into registration with the chute 210 missing the seed. Seeds in wells 240 at the ends of the conveyor belt 260 fall out of wells when moving the conveyor, and enter the catch bin 80 via one or more ramps 280. The seed is delivered into the chute 210 missing the seed. The controller 11 then confirms that the seed was delivered into the chute 210 and that each chute includes a seed using the signals from the imaging sensors 232. After confirming the chutes 210 have seeds, the controller 11 lowers the chutes and then operates the barrier driver 226 to open the barriers 224 so that the seeds fall through the lower ends 218 of the chutes and onto the tray in a single row.

The above operation is the same for subsequent rows of seeds until a selected number of rows of seeds are placed on the tray. Depending on the number of makeup seeds needed, the controller 11 may operate the seed correction assembly 204 to dump all of the remaining makeup seeds out of the wells 240 by moving the conveyor belt, 260 and then refilling each of the wells with a makeup seed from the vacuum cylinder 42.

Figure 25:
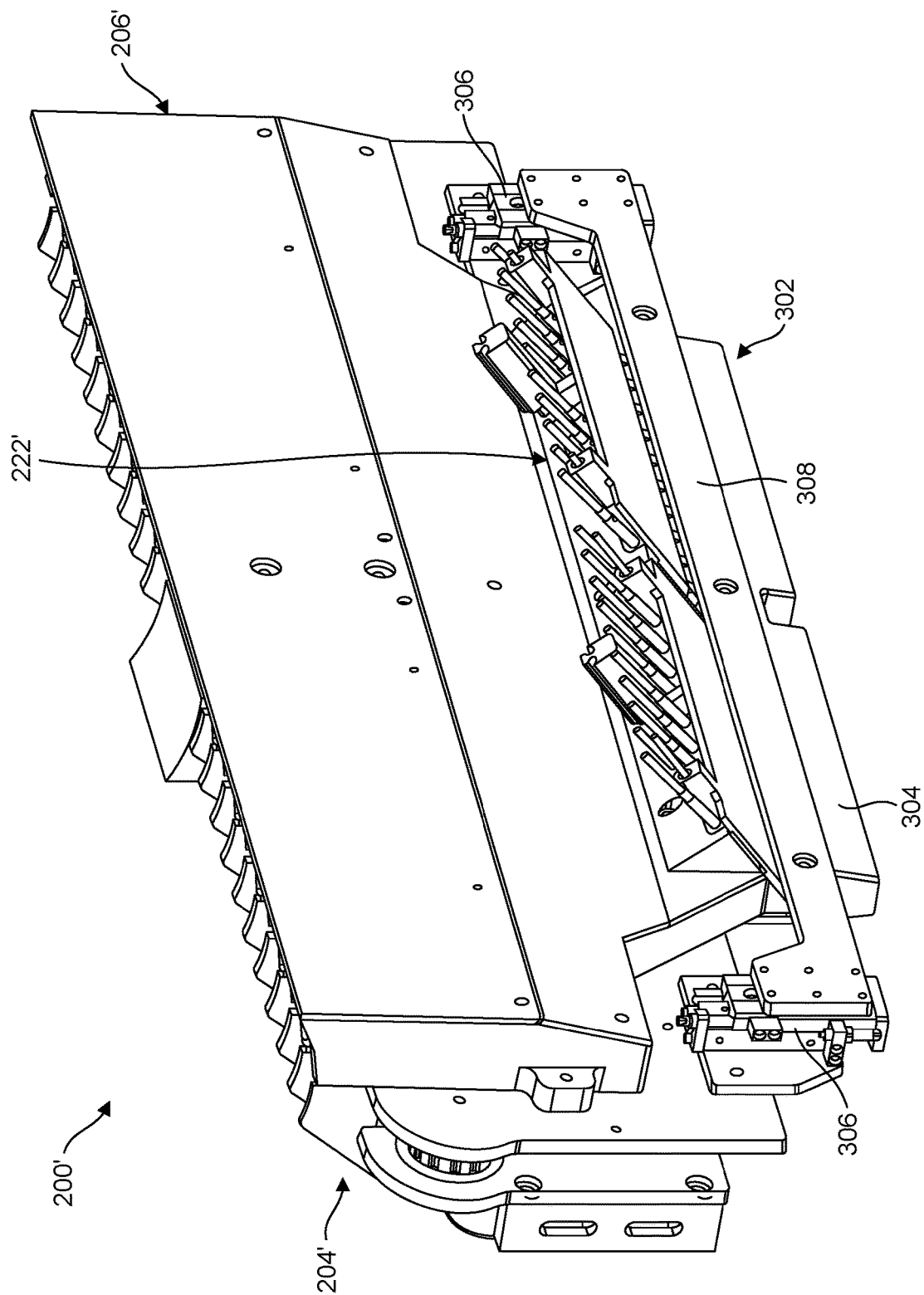
FIG. 25 is an enlarged front perspective of another embodiment of a seed placement system.
Figure 26:
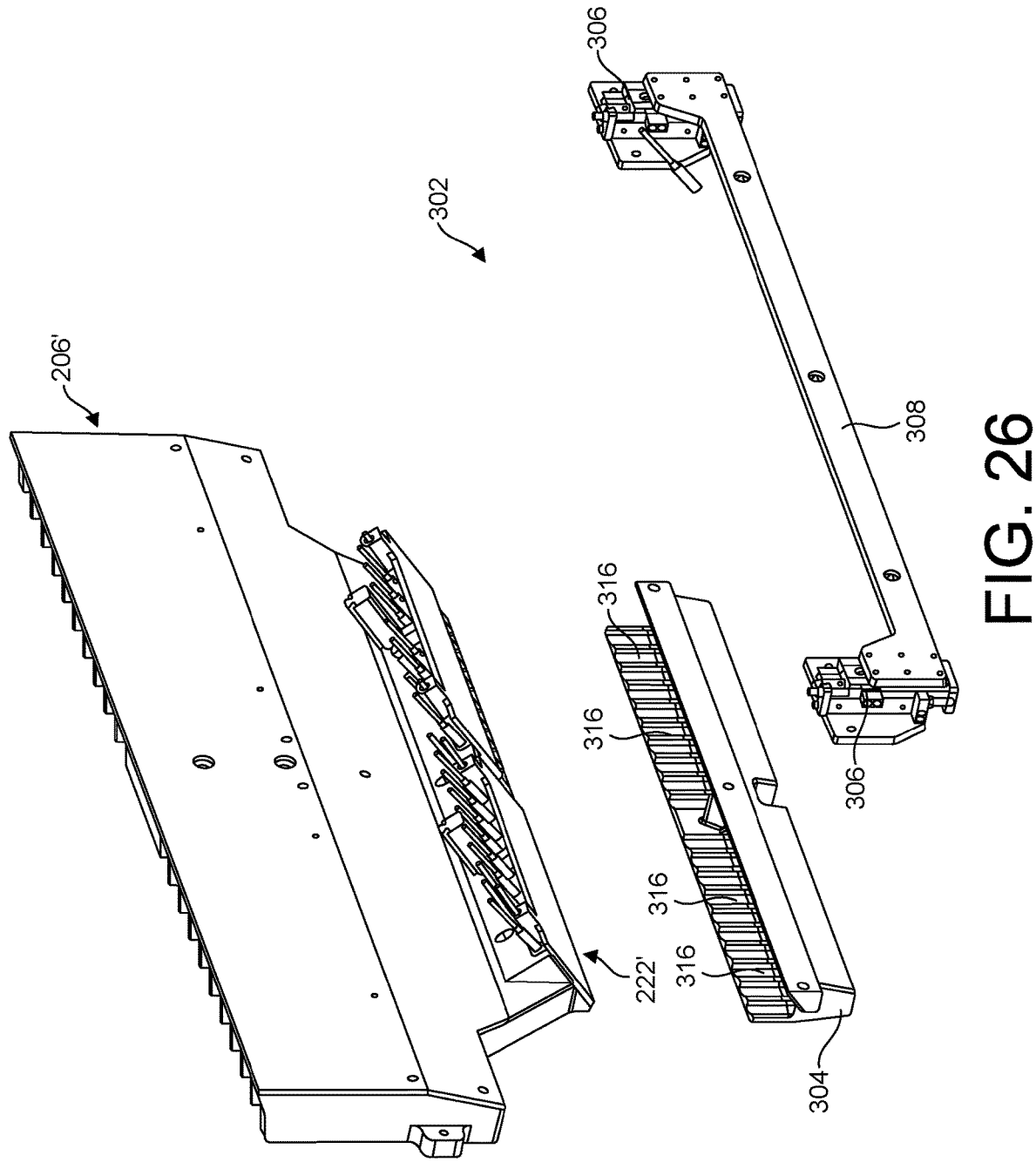
FIG. 26 is an exploded perspective of a seed chute assembly of the seed placement system.
Figure 27:
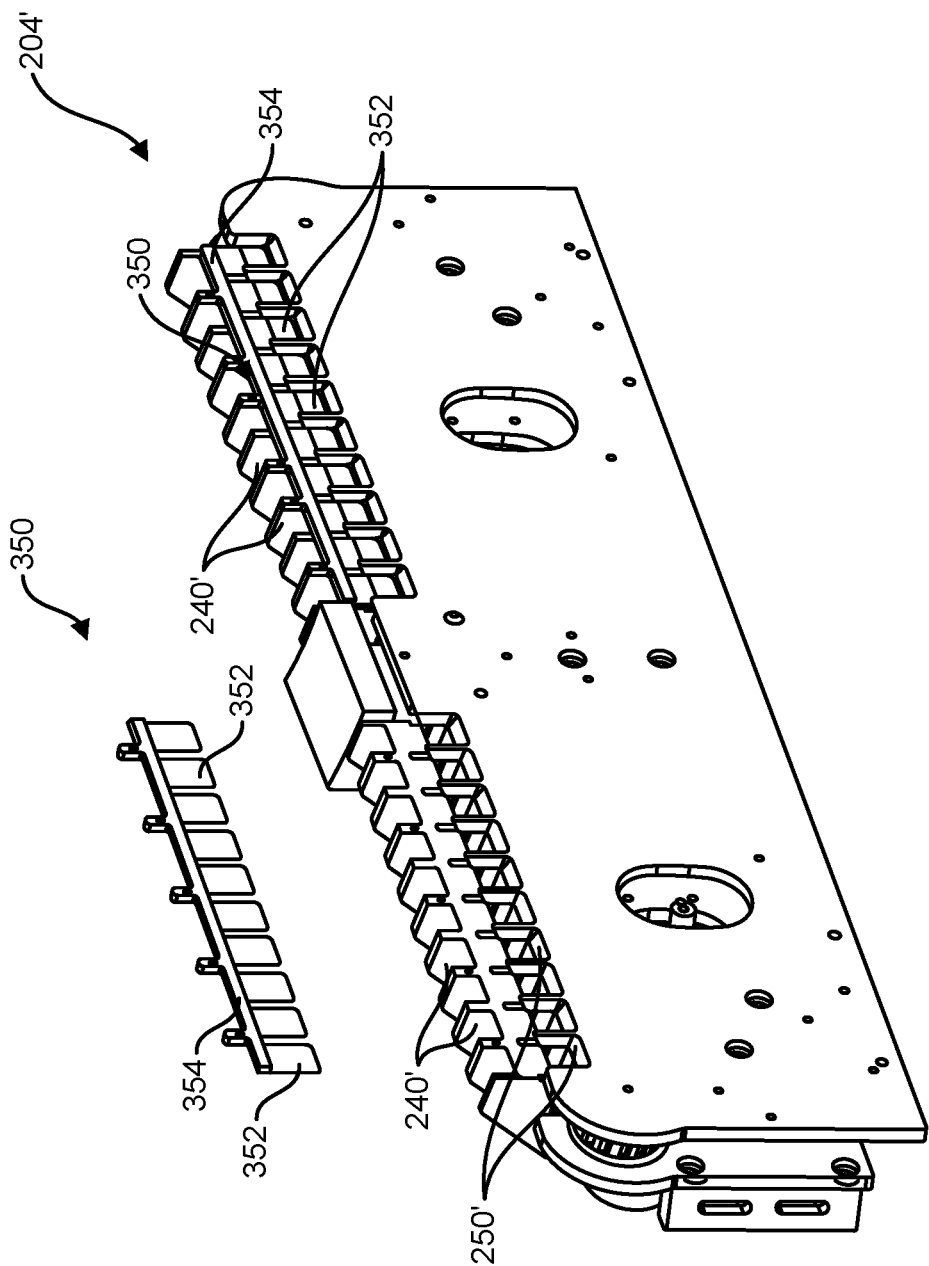
FIG. 27 is an enlarged front perspective of the seed correction assembly of the seed placement system, with a flap assembly thereof.

Referring to FIGS. 25-27, another embodiment of a seed placement system 200' is similar to the seed placement system 200, with like components indicated by corresponding reference numerals plus a prime symbol. Unless otherwise described, the seed placement system 200' is the same or substantially similar to the seed placement system 200. The main difference between the two seed placement systems 200, 200' is that the present seed placement system 200' includes a movable lower cap assembly, generally indicated at 302, disposed immediately below the lower ends of the chutes (hidden in FIGS. 25 and 26). The lower cap assembly 302 includes a lower cap 304, a cap driver 306 (e.g., two cap drivers), and a bracket 308 connecting the cap driver to the lower cap. The cap driver(s) 306 may be pneumatically driven cylinder(s) (or other drivers) having one end mounted on the structural support 12 of the seed planter and the other end secured to the bracket 308. A controller controls operation of the cap driver(s) 306 in the same manner as the chute driver 234, as described above, to move the lower cap 304 upward and downward for placing the rows of seeds on the tray.

The lower cap 304 defines a plurality of through channels 316 in registration with the lower ends of the respective chutes for receiving the seeds from the chutes and delivering the seeds to the tray. As such, each of the channels 316 can be considered to be part of the corresponding chute. In this embodiment, only the lower cap 304 is movable vertically from a first, upper position (FIG. 25) to a second, lower position closer to the tray. In the first, upper position, a lower end of the cap 304 is disposed a suitable distance above the tray conveyor 20 to allow a tray conveyed by the conveyor to be disposed below the lower end of the cap. In the second, lower position, the lower end of the cap 304 is moved closer to the tray and receives the seeds from the chutes (such as chutes 210) to facilitate proper placement of the seeds on the tray. The controller (e.g., the seed placement controller 11) may be in communication with the cap driver 306 (or a power source of the cap driver) to control operation of the chute driver, and thus control lowering and raising the cap 304 during operation. This operation would follow the operation explained in more detail below.

Another difference between the two seed placement systems 200, 200' is that the present seed placement system 200', more specifically the seed correction assembly 204', includes a flap assembly 350 (e.g., at least one flap assembly). The illustrated embodiment includes two flap assemblies 350. Each flap assembly 350 includes a plurality of movable flaps 352 secured to a bracket 354. The bracket 354 is in turn mounted on the seed correction body 238' such that each flap 352 is in registration with and covering the opening 250' of a respective one of the wells 240'. The corresponding flap 352 is openable upon application of the pulse of air to deliver the correction seed into a chute. Thus, the flaps 352 inhibit inadvertent displacement of the seeds into the chute.

Implementation of Seed Planter

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An automated seed planter comprising:
a negative pressure source; and
at least two rotatable vacuum cylinders aligned about a single rotational axis, each of the at least two vacuum cylinders including:
multiple flow paths within the vacuum cylinder, each of the flow paths in fluid communication with the negative pressure source, at least one of the flow paths configured to provide a first pressure within the vacuum cylinder, and at least another one of the flow paths configured to provide a second pressure within the vacuum cylinder different than the first pressure; and
multiple openings in fluid communication with the flow paths;
wherein the at least two vacuum cylinders are configured to independently and/or simultaneously pick up and deliver seeds, via the multiple openings, to a single planting tray.

2. The automated seed planter set forth in claim 1, further comprising a controller configured to selectively apply negative pressure to the at least two vacuum cylinders as the at least two vacuum cylinders are rotating.

3. The automated seed planter set forth in claim 2, wherein each of the at least two rotatable vacuum cylinders defines rows of the multiple openings, wherein the rows of openings are circumferentially spaced apart from one another, each of the rows of openings being in fluid communication with a dedicated one of the flow paths fluidly connecting the corresponding row of openings to the negative pressure source.

4. The automated seed planter set forth in claim 2, further comprising valves fluidly connected to the flow paths between the negative pressure source and the vacuum cylinders, wherein the controller is in communication with the valves and configured to control the valves for selectively delivering negative pressure from the negative pressure source to the flow paths to thereby provide the first pressure within the vacuum cylinder, at the at least one of the multiple flow paths, and the second pressure within the vacuum cylinder, at the at least another one of the multiple flow paths.

5. The automated seed planter set forth in claim 4, further comprising a positive pressure source in fluid communication with the dedicated flow paths upstream of the valves, wherein the controller is configured to control the valves for selectively delivering positive pressure from the positive pressure source to the flow paths.

6. The automated seed planter set forth in claim 2, further comprising a motor configured to drive rotation of the at least two vacuum cylinders, wherein the controller is configured to selectively operate the motor.

7. The automated seed planter set forth in claim 1, further comprising at least one imaging sensor in communication with the controller and configured to image a selected at least one of the openings of the at least two vacuum cylinders, wherein the controller is configured to receive image data from the at least one imaging sensor to determine at least one of: i) whether one or more seeds are missing from the selected at least one of the openings; and ii) whether the selected at least one of the openings has one or more excess seeds.

8. The automated seed planter set forth in claim 7, wherein the at least one imaging sensor comprises at least one near infrared imaging sensor.

9. The automated seed planter set forth in claim 1, further comprising:
a plurality of vertical seed chutes disposed below the at least two vacuum cylinders and configured to receive seeds therein, the vertical seed chutes having open upper and lower ends; and
a shutter assembly associated with the lower ends of the vertical seed chutes, the shutter assembly configured to selectively open and close the lower ends of the seed chutes to deliver the seeds to the single planting tray.

10. The automated seed planter set forth in claim 9, further comprising a seed correction assembly including a plurality of seed wells disposed below the at least two vacuum cylinders and configured to receive seeds therein, wherein the seed correction assembly is configured to selectively displace one or more of the seeds from the seed wells to deliver the one or more seeds toward the vertical seed chutes.

11. The automated seed planter set forth in claim 1, further comprising a conveyor configured to position the seed tray in the seed planter to receive the seeds delivered from the at least two vacuum cylinders.

* * * * *